US012136318B2

(12) United States Patent
Chan et al.

(10) Patent No.: US 12,136,318 B2
(45) **Date of Patent: *Nov. 5, 2024**

(54) GAMING DEVICE WITH A CHANGING ARRANGEMENT OF SYMBOL DISPLAY POSITIONS

(71) Applicant: Aristocrat Technologies Australia Pty Limited, North Ryde (AU)

(72) Inventors: Matthew Chan, Gordon (AU); Paul Lombardo, Newport (AU); Claire Mileto, Ropes Crossing (AU); James Kroon, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,971

(22) Filed: Dec. 5, 2022

(65) Prior Publication Data

US 2023/0107038 A1 Apr. 6, 2023

Related U.S. Application Data

(63) Continuation of application No. 16/773,530, filed on Jan. 27, 2020, now Pat. No. 11,527,134.

(30) Foreign Application Priority Data

Feb. 14, 2019 (AU) ................................ 2019201024

(51) Int. Cl.
*G07F 17/32* (2006.01)
*G07F 17/34* (2006.01)

(52) U.S. Cl.
CPC ...... *G07F 17/3262* (2013.01); *G07F 17/3213* (2013.01); *G07F 17/34* (2013.01)

(58) Field of Classification Search
CPC ... G07F 17/3262; G07F 17/3213; G07F 17/34
See application file for complete search history.

(56) References Cited

U.S. PATENT DOCUMENTS 6,120,377 A * 9/2000 McGinnis, Sr. ........ G07F 17/34 463/20
6,123,333 A * 9/2000 McGinnis, Sr. .... G07F 17/3244 273/146

(Continued)

OTHER PUBLICATIONS

Office Action (Non-Final Rejection) dated Dec. 21, 2021 for U.S. Appl. No. 16/850,704 (pp. 1-11).

(Continued)

*Primary Examiner* — Dmitry Suhol
*Assistant Examiner* — Jason Pinheiro
(74) *Attorney, Agent, or Firm* — Armstrong Teasdale LLP

(57) ABSTRACT

A gaming device comprises a display, a processor, and a memory storing (a) a current symbol position state defining, for each of a plurality of columns of symbol positions, a number of symbol positions for which symbols are to be selected; (b) a pay table; and (c) instructions. The instructions cause the processor to control the display to display a plurality of columns of symbol positions corresponding to the current symbol position state, select symbols for the displayed symbol positions by selecting stopping positions of a plurality of reel strips, wherein at least one of the reel strips comprises at least one designated symbol, evaluate the symbols for winning combinations based on the pay table, and responsive to the selected symbols of a column including a designated symbol, modify the symbol position state for the respective column to include at least one additional symbol position for a next symbol selection.

17 Claims, 27 Drawing Sheets

(56) References Cited

U.S. PATENT DOCUMENTS 6,305,686 B1 * 10/2001 Perrie ..................... G07F 17/34 463/20
6,336,860 B1 * 1/2002 Webb ..................... G07F 17/32 463/16
6,508,469 B2 * 1/2003 Promutico .......... A63F 3/00157 273/274
6,520,856 B1 * 2/2003 Walker ................ G07F 17/3244 463/21
6,932,340 B1 * 8/2005 Schaefer ............. G07F 17/3244 273/146
6,932,700 B2 * 8/2005 Bennett ................... G07F 17/34 463/16
7,210,997 B2 * 5/2007 Hughs-Bair ........ G07F 17/3244 463/20
7,624,986 B2 * 12/2009 Nicely ...................... A63F 9/04 273/146
8,556,699 B2 10/2013 Kato
8,795,048 B2 * 8/2014 Schaefer ............. G07F 17/3267 463/25
8,795,059 B2 * 8/2014 Aoki ................... G07F 17/3213 463/20
9,189,926 B2 * 11/2015 Hallerbach ............. G07F 17/34
10,102,710 B2 * 10/2018 Boese ................. G07F 17/3244
10,186,107 B2 * 1/2019 Kitamura ............ G07F 17/3267
10,255,751 B2 * 4/2019 Boese ....................... A63F 9/24
10,332,334 B2 * 6/2019 Bolling, Jr. ......... G07F 17/3209
11,257,327 B1 * 2/2022 Sanborn .............. G07F 17/3258
11,551,514 B2 * 1/2023 Indrakumar ........ G07F 17/3267
2001/0034264 A1 * 10/2001 Berman .............. G07F 17/3286 463/22
2005/0159208 A1 * 7/2005 Pacey ................. G07F 17/3211 463/20
2006/0116194 A1 * 6/2006 Pacey ................. G07F 17/3262 463/20
2007/0060293 A1 * 3/2007 Svanas .................... G07F 17/32 463/20
2007/0060299 A1 * 3/2007 Nelson ................ G07F 17/3267 463/20
2007/0191084 A1 * 8/2007 Tarantino ................ G07F 17/32 463/16
2008/0064477 A1 * 3/2008 Fong ................... G07F 17/3223 463/20
2008/0108411 A1 * 5/2008 Jensen ................ G07F 17/3286 463/20
2009/0137309 A1 * 5/2009 Thomas .............. G07F 17/3211 463/20
2011/0045906 A1 * 2/2011 Berman .............. G07F 17/3202 463/43
2012/0115606 A1 * 5/2012 Seelig ................. G07F 17/3213 463/32
2013/0065663 A1 * 3/2013 Johnson .............. G07F 17/3213 463/20
2015/0379831 A1 * 12/2015 Lee ........................ G07F 17/326 463/20
2016/0140799 A1 5/2016 Berman
2017/0154499 A1 6/2017 Lange
2017/0236383 A1 8/2017 Nakamura
2017/0365127 A1 12/2017 Zoble
2018/0025585 A1 * 1/2018 Schmidt .............. G07F 17/3211 463/20
2019/0130696 A1 5/2019 Compton
2019/0156633 A1 5/2019 Halvorson
2020/0250923 A1 8/2020 Ceniceroz

OTHER PUBLICATIONS

Office Action (Non-Final Rejection) dated May 24, 2022 for U.S. Appl. No. 16/850,704 (pp. 1-13).
Office Action (Non-Final Rejection) dated Mar. 28, 2022 for U.S. Appl. No. 16/773,530 (pp. 1-21).
Office Action (Final Rejection) dated Dec. 6, 2022 for U.S. Appl. No. 16/850,704 (pp. 1-12).
Office Action (Notice of Allowance and Fees Due (PTOL-85)) dated Aug. 25, 2022 for U.S. Appl. No. 16/773,530 (pp. 1-7).
Office Action (Non-Final Rejection) dated Apr. 12, 2023 for U.S. Appl. No. 16/850,704 (pp. 1-15).
Office Action (Notice of Allowance and Fees Due (PTOL-85)) dated Oct. 24, 2023 for U.S. Appl. No. 16/850,704 (pp. 1-8).

* cited by examiner

300

| REEL STRIP POSITION | BASE REAL 1 (321) | BASE REAL 2 (322) | BASE REAL 3 (323) | BASE REAL 4 (324) | BASE REAL 5 (325) |
|---|---|---|---|---|---|
| 1 (301) | Symbol 4 | Wild | Symbol 3 | Symbol 9 | Symbol 1 |
| 2 (302) | Symbol 1 | Symbol 9 | Symbol 7 | Symbol 8 | Wild |
| 3 (303) | Symbol 3 | Symbol 7 | Wild | Wild | Symbol 8 |
| 4 (304) | Symbol 1 | Symbol 8 | Symbol 9 | Symbol 2 | Symbol 2 |
| 5 (305) | Symbol 1 | Symbol 5 | Symbol 7 | Symbol 4 | Symbol 8 |
| 6 (306) | Symbol 1 | Symbol 2 | Symbol 1 | Symbol 6 | Symbol 4 |
| 7 (307) | Symbol 2 | Symbol 2 | Symbol 6 | Symbol 4 | Symbol 4 |
| 8 (308) | Symbol 8 | Symbol 7 | Symbol 5 | Wild (331) | Symbol 1 |
| 9 (309) | Symbol 9 | Symbol 9 | Symbol 7 | Symbol 8 | Symbol 7 |
| 10 (310) | Symbol 7 | Wild | Symbol 3 | Symbol 9 | Symbol 5 |
| 11 (311) | Symbol 6 (343) | Symbol 8 | Symbol 3 | Symbol 6 | Symbol 5 |
| 12 (312) | Symbol 3 (342) | Symbol 2 | Symbol 4 | Symbol 4 | Symbol 5 |
| 13 (313) | Symbol 3 (341) | Symbol 2 | Symbol 4 | Symbol 4 | Symbol 5 |
| 14 (314) | Wild | Symbol 6 | Symbol 8 | Symbol 3 | Symbol 6 |
| 15 (315) | Symbol 7 | Wild | Symbol 3 | Symbol 1 | Symbol 8 |

FIG. 3

GAMING DEVICE WITH A CHANGING ARRANGEMENT OF SYMBOL DISPLAY POSITIONS

CROSS-REFERENCE TO RELATED APPLICATIONS

This application is a continuation of and claims priority to U.S. patent application Ser. No. 16/773,530, filed Jan. 27, 2020, and entitled "GAMING DEVICE WITH A CHANGING ARRANGEMENT OF SYMBOL DISPLAY POSITIONS," which claims priority from Australian Application No. 2019201024 entitled "GAMING DEVICE WITH A CHANGING ARRANGEMENT OF SYMBOL DISPLAY POSITIONS" filed on Feb. 14, 2019, the contents and disclosures of each of which are hereby incorporated herein by reference in their entirety.

FIELD

The present application relates to a gaming device, a method and gaming system with a changing arrangement of symbol display positions.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments provide a gaming device, a method and gaming system with a changing arrangement of symbol positions for which symbols are selected. The arrangement of symbol positions changes if certain symbols are selected in prior games. A current symbol position state is stored which controls how many symbol positions are active in a given game. If certain symbols are selected, the symbol position state is updated for the next game by adding at least one symbol position so that symbols are selected for more symbol positions in a next game.

An embodiment provides gaming device comprising a display, a processor, and a memory storing (a) a current symbol position state defining, for each of a plurality of columns of symbol positions, a number of symbol positions for which symbols are to be selected; (b) a pay table; and (c) instructions. When the instructions are executed by the processor cause the processor to control the display to display a plurality of columns of symbol positions corresponding to the current symbol position state, select symbols for the displayed symbol positions by selecting stopping positions of a plurality of reel strips, wherein at least one of the reel strips comprises at least one designated symbol, evaluate the selected symbols for winning combinations based on the pay table, and responsive to the selected symbols of a column including a designated symbol, modify the symbol position state for the respective column to include at least one additional symbol position for a next symbol selection.

Another embodiment provides method of operating a gaming device having a display. The method comprises storing a current symbol position state defining, for each of a plurality of columns of symbol positions, a number of symbol positions for which symbols are to be selected, controlling the display to display a plurality of columns of symbol positions corresponding to the current symbol position state, selecting symbols for the displayed symbol positions by selecting stopping positions of a plurality of reel strips, wherein at least one of the reel strips comprises at least one designated symbol, evaluating the selected symbols for winning combinations based on a pay table, and responsive to the selected symbols of a column including a designated symbol, modifying the stored symbol position state for the respective column to include at least one additional symbol position for a next symbol selection.

Another embodiment provides a gaming system comprising a display, one or more processors, and a memory storing (a) a current symbol position state defining, for each of a plurality of columns of symbol positions, a number of symbol positions for which symbols are to be selected; (b) a pay table; and (c) instructions. When the instructions are executed by the one or more processors, they cause the one or more processors to control the display to display a plurality of columns of symbol positions corresponding to the current symbol position state, select symbols for the displayed symbol positions by selecting stopping positions of a plurality of reel strips, wherein at least one of the reel strips comprises at least one designated symbol, evaluate the selected symbols for winning combinations based on the pay table, and responsive to the selected symbols of a column including a designated symbol, modify the symbol position state for the respective column to include at least one additional symbol position for a next symbol selection.

BRIEF DESCRIPTION OF THE DRAWINGS

FIG. 3 illustrates an example reel strip layout.

DETAILED DESCRIPTION

The detailed description presents innovations in user interface ("UI") features of electronic gaming devices, as well as innovations in features of backend processing to implement the UI features. For example, gaming systems that enable modifying a symbol position state during gameplay (e.g., in a slot-type game) are described. The symbol position state may be modified by determining stopping positions of a plurality of overlay reel strips, each including designated symbols indicating a change in symbol position state for a given column. In exemplary implementations, as the number of symbol positions in a given column changes, different overlay reels (e.g., overlay reels including fewer designated symbols) are used to determine whether to modify the symbol position state. As a result, the probability that any column will grow may be controlled even as the symbol position state for a given column changes. Moreover, in example implementations, prior to beginning each game (e.g., prior to each spin of the slot-type game) a user may select from a plurality of bet options to place on the game. A memory may store symbol position states for each of the selectable bet options and change the current symbol position state to the stored state for the associated selected bet option. As a result, some of the gaming systems described herein inhibit opportunistic betting strategies by players, wherein the player bets low when the number of symbol positions is low and increases their selected bet as the number of symbol positions grow.

Figure 1:
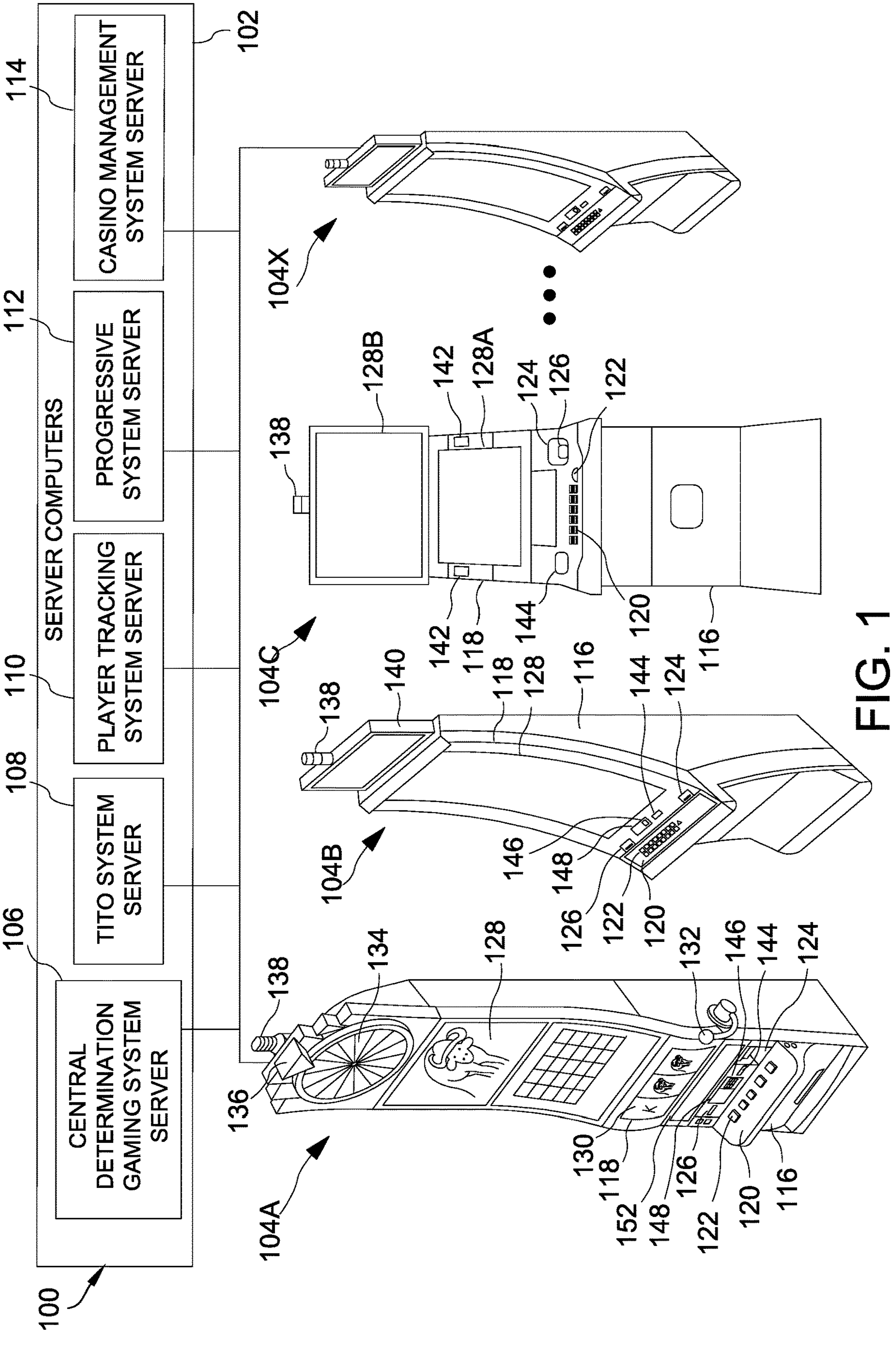
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
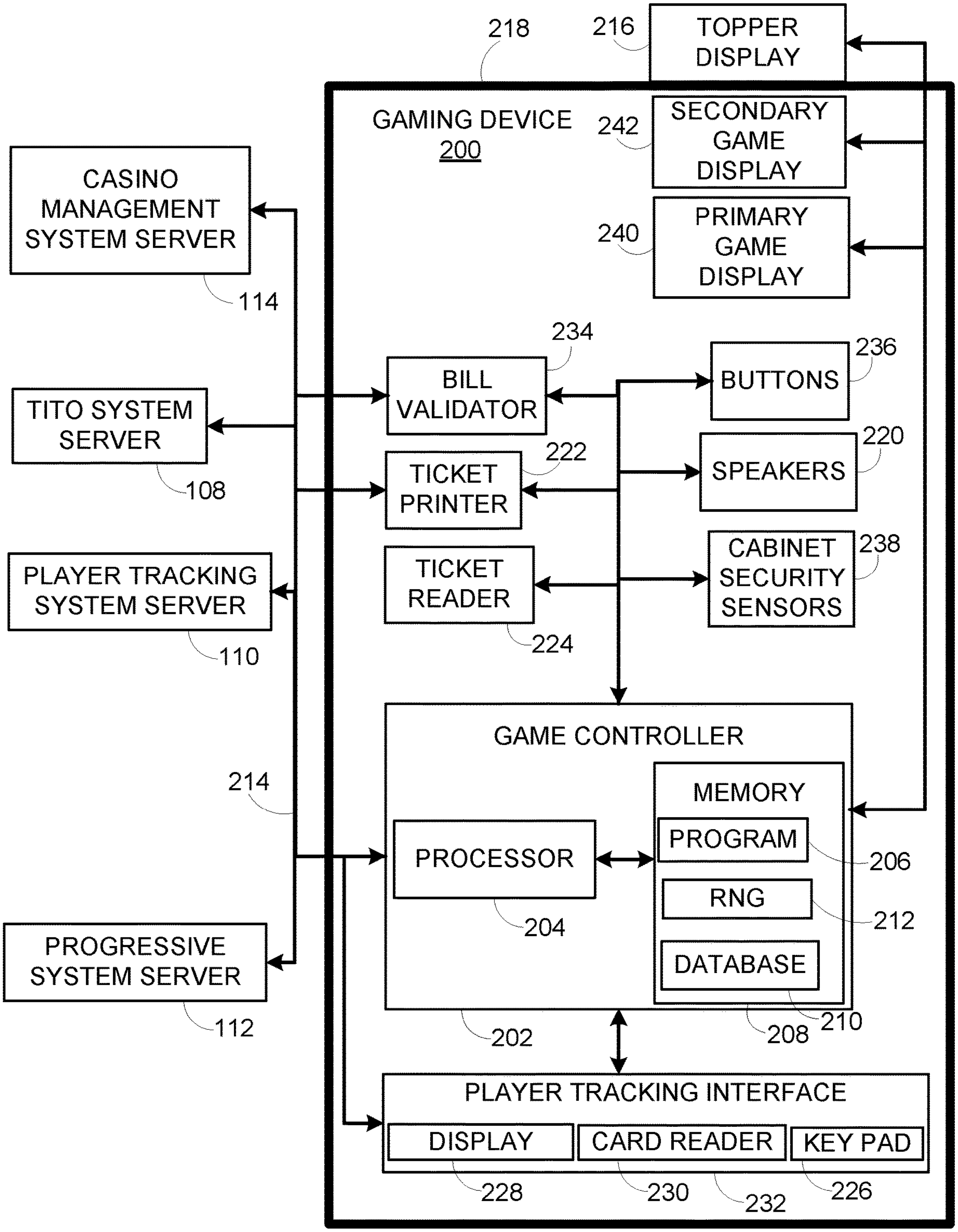
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5A:
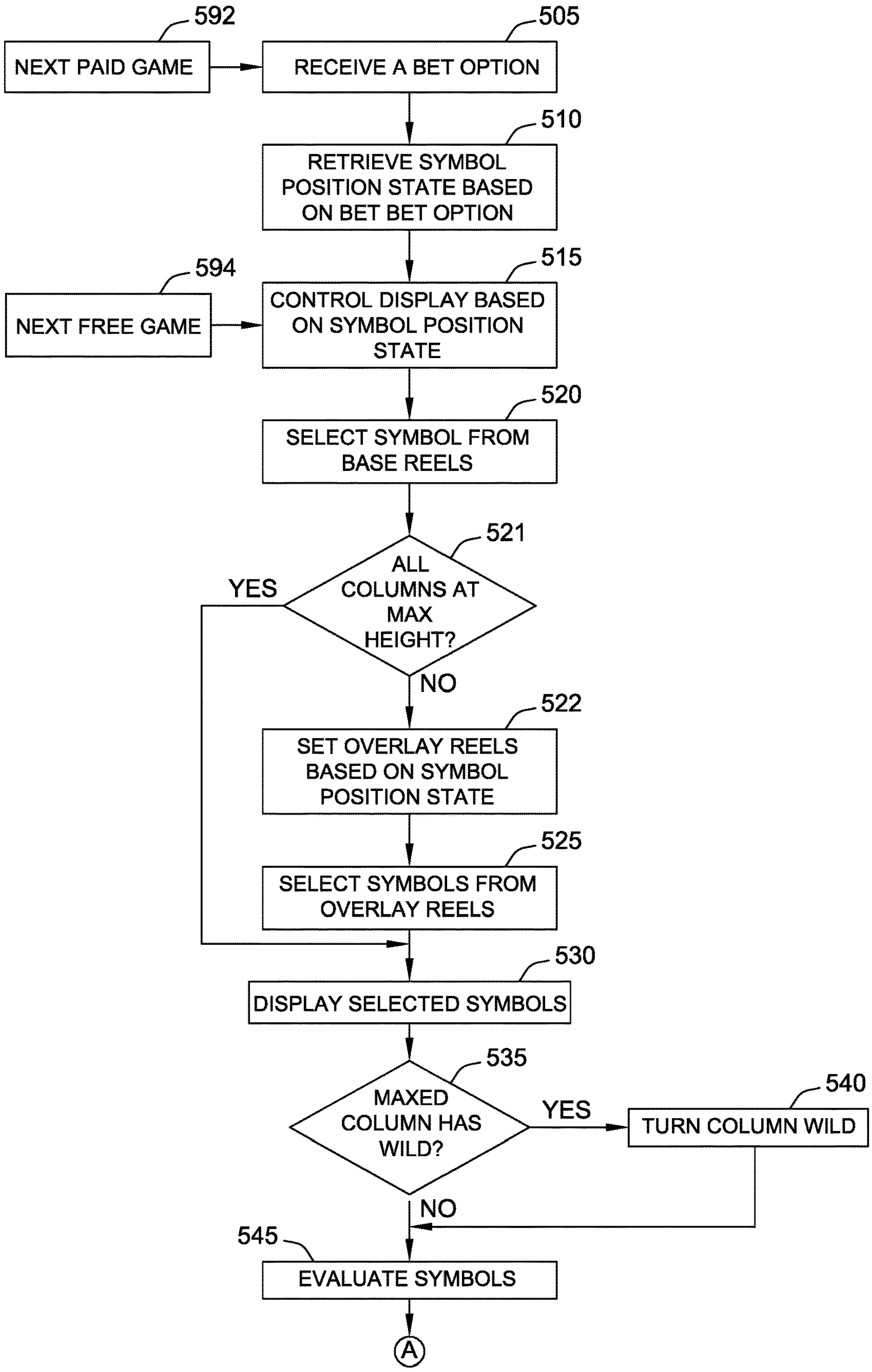
FIGS. 5A and 5B show a flow chart of an embodiment.
Figure 5B:
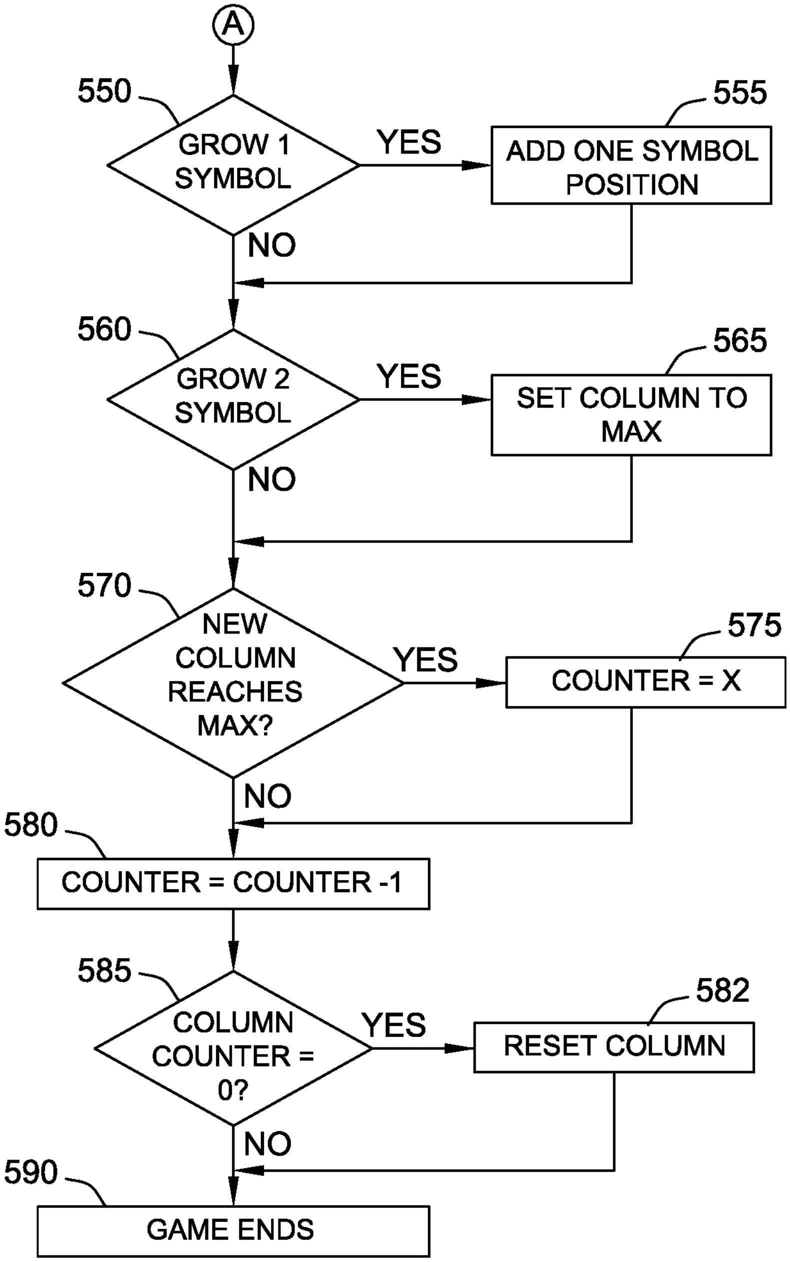

FIG. 5 is a flow chart of an embodiment. At step 505, the processor 204 receives a selection of a bet option from the player, for example, via buttons 236. In an example, there are a plurality of bet options where bet1<bet2<bet3 etc. As indicated above, in embodiments of the number of symbol positions for which symbols will be selected (and thus be used in evaluation of a game outcome) depends on prior game outcomes and can increase relative to a starting number of symbol positions. To avoid a player selecting a lower bet option when the number of symbol positions have not increased or have only increased a little, and then changing to a higher bet option once there is substantial growth in the number of symbol positions, the gaming device 200 stores a current symbol position state for each bet option in memory 208, so that changing the bet option reverts the symbol array to the stored status for that bet option. Each bet option therefore operates independently of the other wagering options.

In order to implement this feature, at step 510, the processor 204 retrieves the symbol position state from memory 208 based on the received bet option. Examples of symbol position states are illustrated in FIGS. 8-25 and will be described in more detail below.

Figure 8:
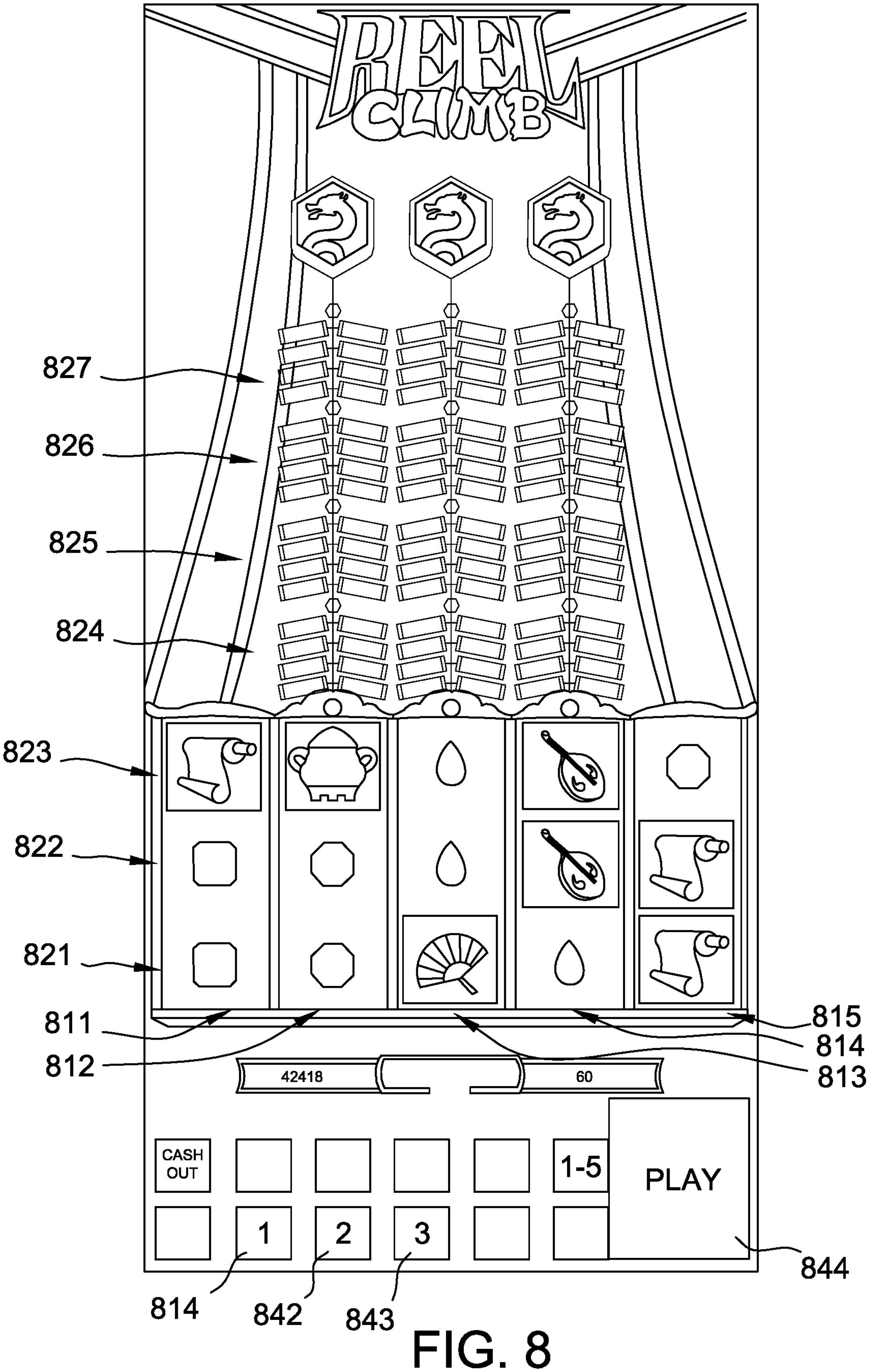
FIG. 8 is an example screen display.

At step 515, processor controls display 240 to display plurality of columns of symbol positions corresponding to the current symbol position state. Referring briefly to FIG. 8, in an example, there are five columns 811-815 of symbol positions. As shown in FIG. 8, in an initial symbol position state three rows 821-823 of symbol positions are displayed for each column of symbol positions such that there are fifteen symbol positions in total. In the example, of FIG. 8, each of columns 812, 813, 814 (the middle three columns) can grow by up to four symbol positions, that is there are four additional rows 824-827 of symbol positions for these three columns 812, 813, 814. In the example, of FIG. 8, the existence of these additional symbol positions is indicated to the player by the presence of firecracker symbols 851, that is to indicate that there is a potential for the number of symbol positions in these columns to grow. Thus, in this example, the firecracker symbols 851, indicate that these rows 824-827 are inactive. Other techniques can be used to indicate that symbol positions are inactive, for example, greying out symbol positions. In other embodiment, there may be nothing to indicate that a column can grow and symbol positions are only displayed if active.

In an example embodiment of the invention, symbols are selected for the symbol positions from two types of reel strips: base reel strips and overlay reel strips, where the overlay reels strips carry the designated symbols that can cause the symbol position state to be changed. In other embodiments, symbols can be selected from a single set of reel strips that includes the designated reel symbols, however, the mechanism employing overlay reel strips has the advantage of enabling more fine-grained control over the probability of growth of the number of symbol positions.

FIG. 3 illustrates an example of a set 300 of five base reel strips 321, 322, 323, 324, 325. In an illustrative example, each base reel strip has fifteen reel strip positions 301-315. Each reel strip position of each base reel strip has a symbol. For example, a "Wild" symbol 331 occupies the eighth reel strip position 306 of the fourth base reel strip 324. Other reels strips to those illustrated in FIG. 3 can be used, for example, base reel strips where two or more wild symbols are placed at consecutive reel strip positions of a base reel strip. In other examples, the base reel strips could have between 30 and 100 reel strip positions. The actual length of the base reel strips depends on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
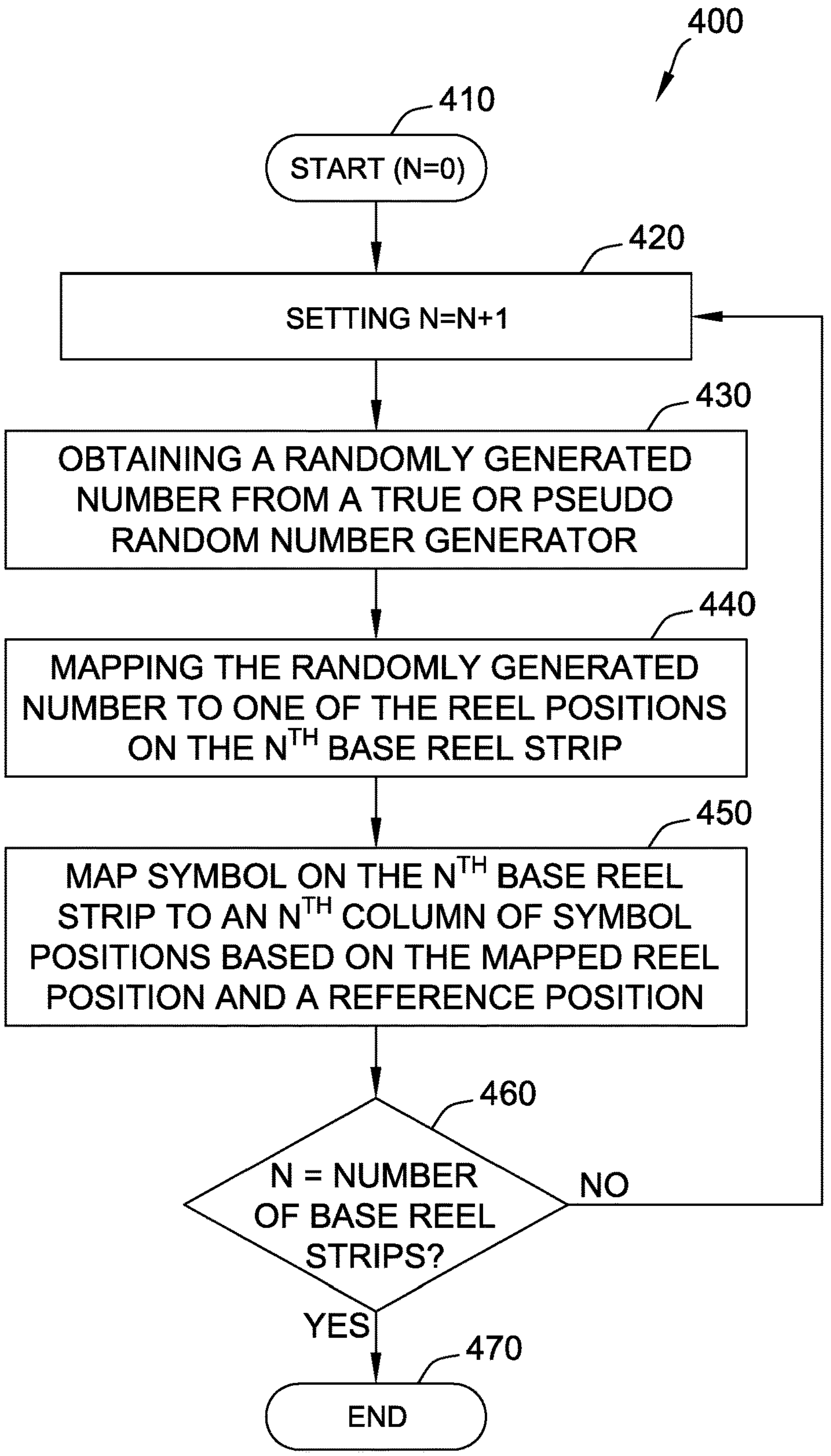
FIG. 4 is a flow chart of a symbol selection method.

FIG. 4 is a flow chart of a method 400 carried out by the processor 204 to select symbols from base reel strips. At step 410, the processor 204 starts the process of selecting symbols with a counter (n) set at zero as symbols have not yet been selected from any base reel strips. At step 420, the processor 204 increments the counter. In the first iteration, the counter is set to 1 to reflect that symbols are to be selected from a first base reel strip. At step 430 the processor obtains a randomly generated number from a true or pseudo random number generator 212. At step 440 the processor maps the generated number to one of the reel positions of the $n^{th}$ base reel strip. In the first iteration, this is the first base reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the base reel strip positions has the same chance of been selected. In other examples, the ranges may be arranged to weight the relative chances of selecting specific base reel strip positions. The base reel strips may be of different lengths.

Figure 10:
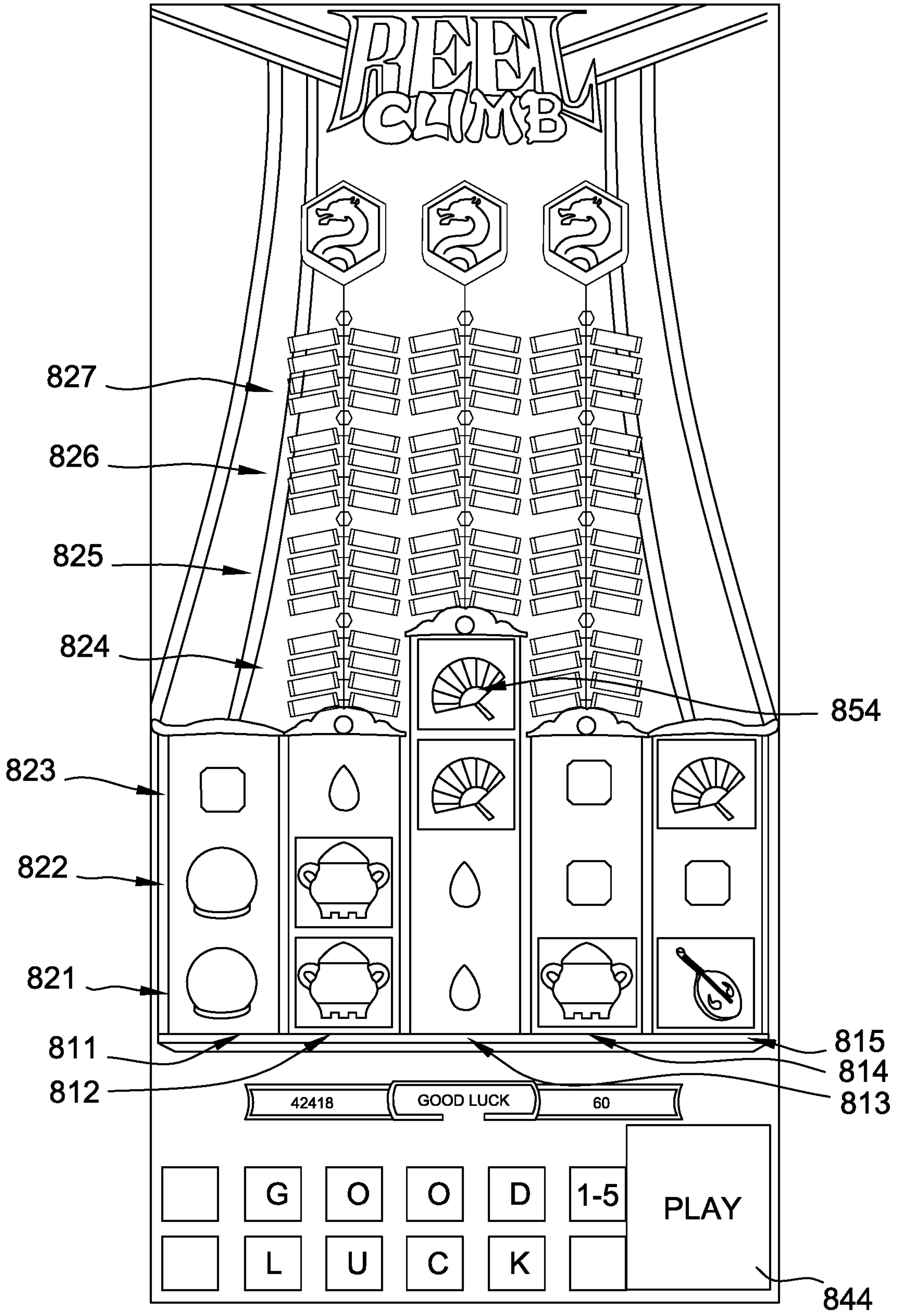
FIG. 10 is an example screen display.

At step 450, the processor 204 maps symbols of the $n^{th}$ base reel strip to an $n^{th}$ column of symbol positions based on the mapped reel position and a reference position. In an example, the reference position is the bottom position of the symbol positions of each column of symbol positions, for example, corresponding to row 821 in FIG. 8. In this example, the selected reel position (and hence the symbol at this position) is mapped to the bottom symbol position of the column. In the example of FIG. 8, there are two other symbol positions in the column of symbol positions and hence symbols at two neighboring base reel strip positions are also mapped to the symbol positions of the column. Referring to the example base reel strips of FIG. 3, if the value returned by the RNG 212 is mapped to reel position 313, then for the first base reel strip 321, "Symbol 3" symbol 341 is mapped to a bottom symbol position, "Symbol 3" symbol 342 is mapped to a middle symbol position, and "Symbol 6" symbol 343 is mapped to a top symbol position. As described in further detail below, the number of symbol positions in one or more columns can increase. When this occurs additional symbols are mapped from the base reel strip to the symbol positions. For example, when as shown in FIG. 10, the middle column 813 has four symbol positions, four symbols will be selected from third base reel strip 323.

At step 460, the processor 204 determines whether symbols have been selected for all of the base reel strips, and if not the processor reverts to step 420 and iterates through steps 430, 440 and 450 until it is determined at step 460 that symbols have been selected from all n base reel strips and mapped to all n columns of symbol positions after which the symbol selection process ends 470. Different numbers of symbols may be mapped to different numbers of symbol positions.

At step 521 the processor 204 determines whether all columns of symbol positions have reached their maximum height because if they have, there is no need to for processor 204 to determine whether they should grow further, and hence no need for processor to conduct steps 522 or 525 because as will be apparent from the following description, the mechanism for deciding whether to grow the reels is dependent on use of set of overlay reels. If the columns have reached the maximum height, the processor proceeds directly to step 530 and displays the selected symbols.

If the columns of symbols are not determined to be at their maximum height at step 521, then at step 522, the processor 204 sets the overlay reels to be used of set of overlay reels stored in memory 208 based on the symbol position state. In an embodiment, a plurality of different overlay reels are used and they are individually selectable for each column.

Figure 6A:
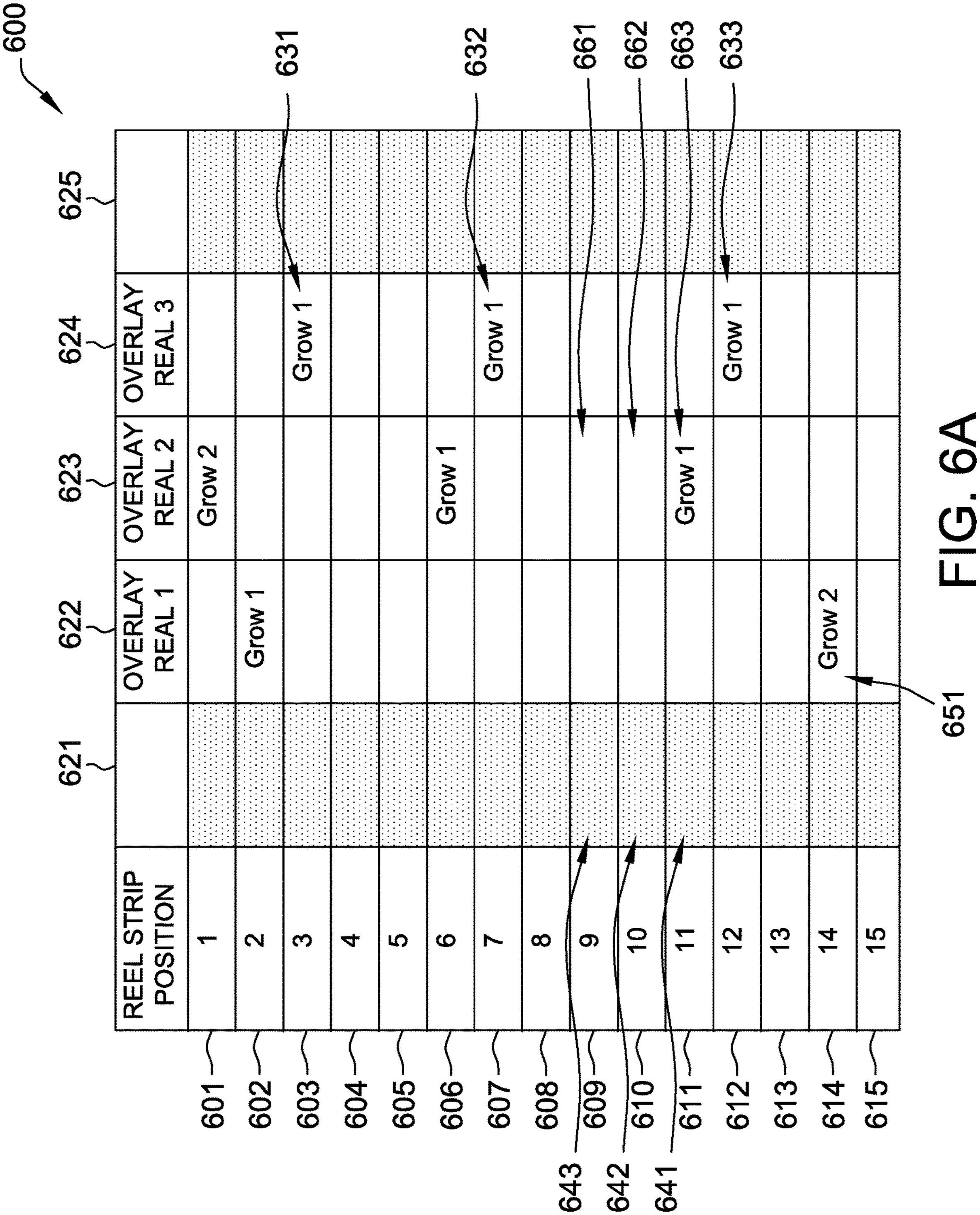
FIGS. 6A and 6B illustrate example overlay reels strip layouts.
Figure 6B:
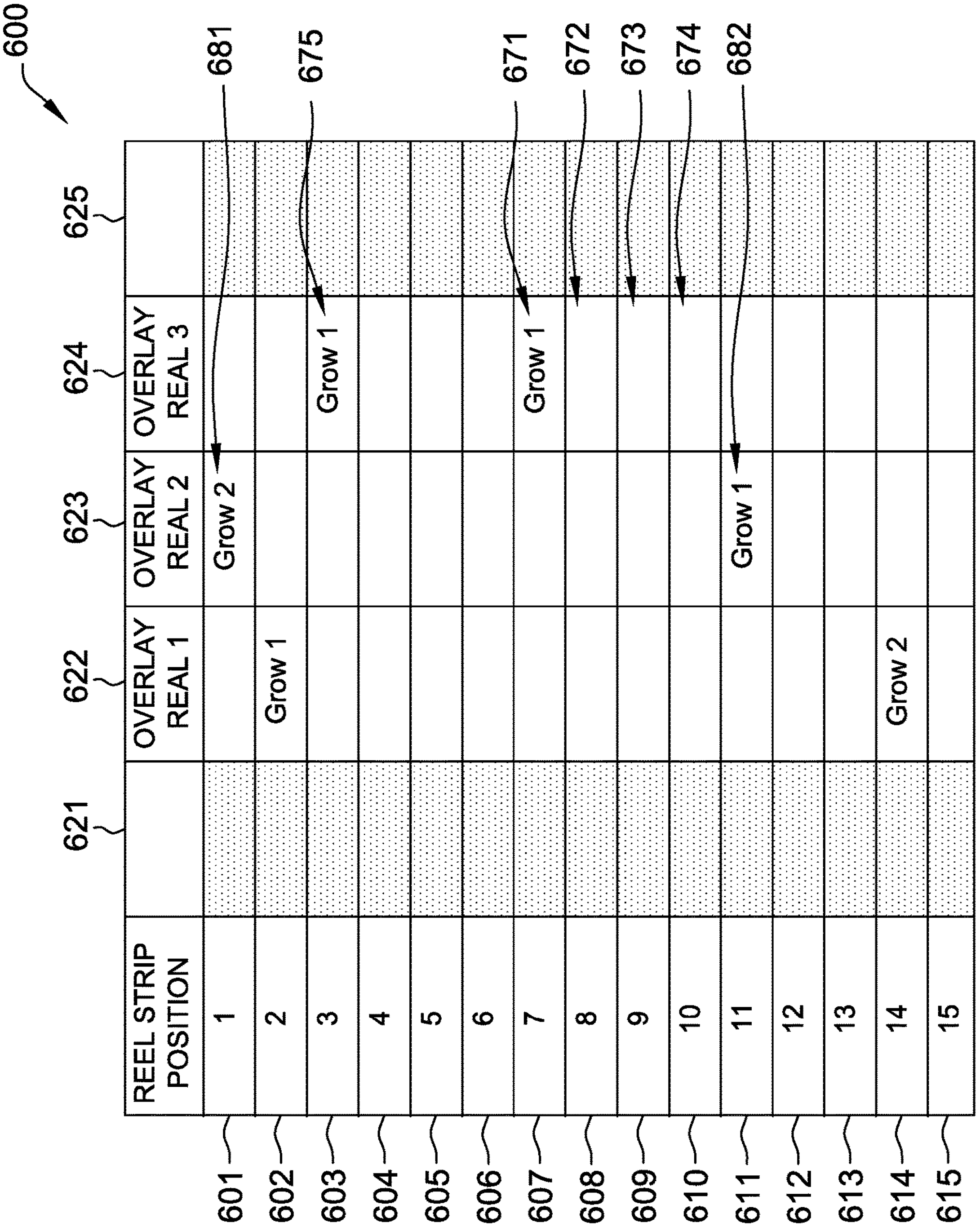

FIGS. 6A and 6B illustrate some example overlay reel strip layouts. As shown in FIG. 6A, there are three overlay reels 622, 623, 624. Columns 621, 625 are shaded to indicate that there are no overlay reels corresponding to the underlying columns of display positions (consistent with the example of FIG. 8). That is to show the correspondence between the overlays reels 622, 623, 624 and the columns 811-815 of FIG. 8. That is, there is no overlay reel corresponding to column 811. There are overlay reels 622-624 corresponding to columns 812-814 and there is no overlay reel corresponding to column 815. As a result, the first and fifth columns 811, 815 cannot grow during play.

In FIG. 6A overlay reels 622-624 are illustrated as having fifteen similar positions 601-615. As with symbol reels 301-315, the overlay reels 622-624 can be of any suitable length and typically will be longer than the illustrative reel shown in FIG. 6A. Overlay reels 622-624 can be of a different length to symbol reels 301-315. In the example, overlay reels 622-624 consist solely of blank or "transparent" positions, for example symbol position 641 having no symbols so that the underlying symbol selected from the base reels will be shown and designated symbols. In this example there are two types of designated symbols, "Grow 1" symbols 631 and "Grow 2" symbols 651. As described in further detail below, "Grow 1" symbols result in one symbol position being added to a column whereas "Grow 2" symbols result in the column of symbol positions being set to a maximum height.

Figure 7:
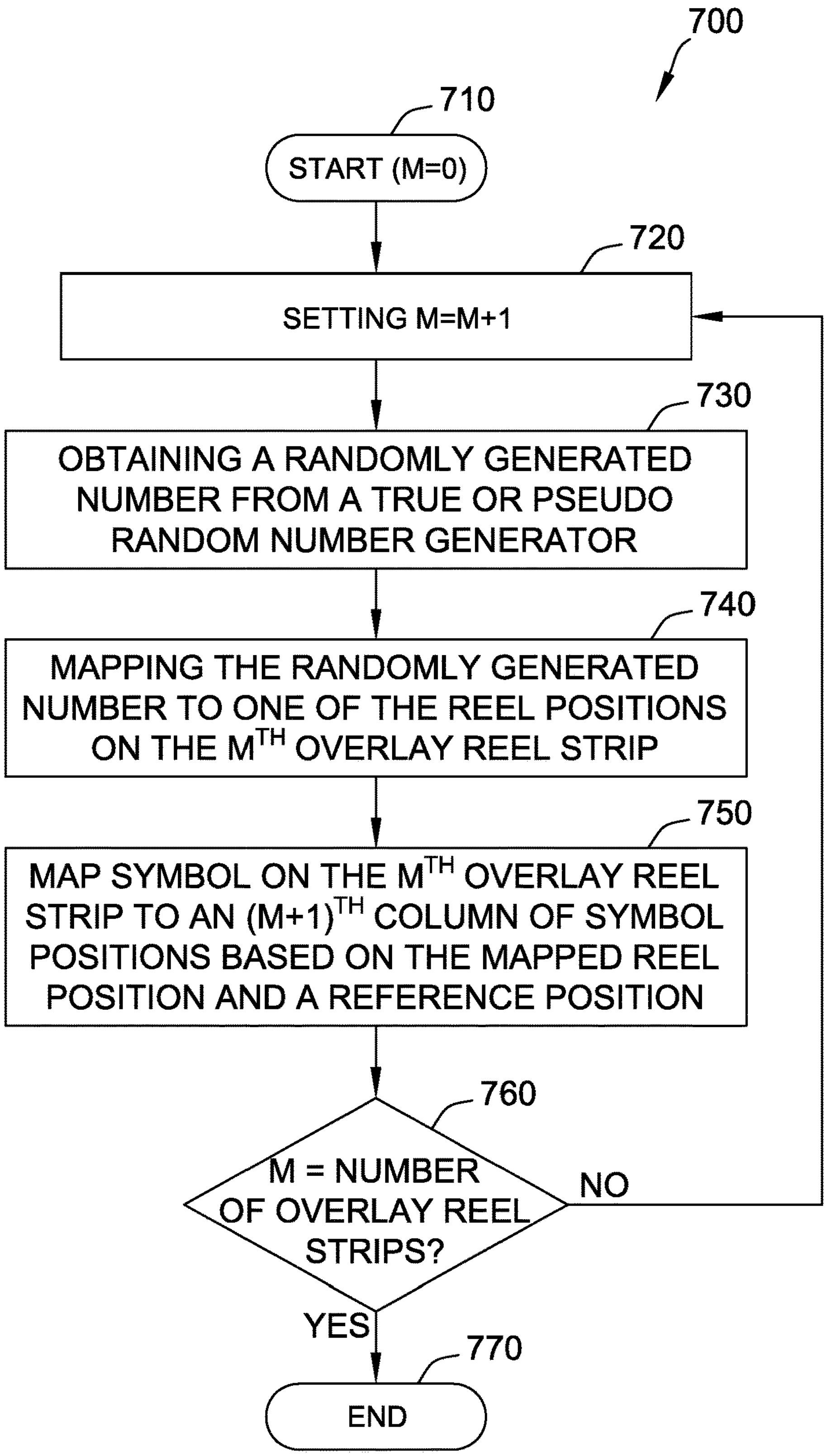
FIG. 7 is a method for selecting from the overlay reel strips.

Referring to FIG. 7 there is shown a method 700 for selecting from the overlay reel strips, which is a modified version of the method set out in FIG. 4. At step 710, the processor 204 starts the process of selecting the symbols with a counter (M) set as zero, as symbols have not yet been selected from any overlay reel strips. At step 720, the processor 204 increments the counter to reflect that symbols are to be selected from the first overlay reel strip. At step 730, the processor obtains a randomly generated number from random number generator 212. At step 740, the processor maps the generated number to one of the reel positions of the current overlay reel strip. In the first iteration, this is the first overlay reel strip. To map the generated number to one of the reel positions, the possible values that can be returned from the random number generator 212 are divided into ranges and associated with specific ones of the reel positions in memory 208. In one example, these ranges are stored in a lookup table. In one example, the ranges are each the same size.

At step 750, the processor maps symbols of the $m^{th}$ overlay reel to an $(m+1)^{th}$ symbol positions based on the reel position and a reference position. The processor 204 maps symbols to the $(m+1)^{th}$ symbol position because there is no overlay strip that corresponds to the first column 811. That is, to ensure correct registration between the overlay reel strips and the underlying symbol positions.

In an example, the reference position is the bottom position of the symbol positions of each column symbol positions, for example corresponding to row 821 in FIG. 8. In this example, the selected reel position (and hence the symbol at this position) is mapped to the bottom symbol position of the column. In the example of FIG. 8 there are two other symbol positions in the second column 812 of symbol positions and hence symbols in two neighboring overlay reel strip positions are also mapped to the symbol positions of the column. In this respect, what is ultimately displayed to the player by the gaming device will depend on whether there is a blank symbol or a grow symbol at any of the relevant positions. For example, referring to FIG. 6A if for first overlay reel 622, the value returned by the RNG 212 is mapped to reel position 611, then a blank symbol will be mapped to the bottom symbol position of the second column 812 in FIG. 8 and further blank symbols 642, 643 will be mapped to the positions above such that no change will be made to the underlying display of symbols selected at step 520.

At step 760, the processor 204 checks whether the counter equals the number of overlay reel strips (here 3) and if it does, the process ends 770. If not the process returns to step 720 and iterates through the steps. If, for example, in the second iteration, the symbol at reel strip position 611 of reel two 623 is selected at step 740, the "Grow 1" symbol 663 will be mapped to the bottom symbol position of the third column 813 with blank symbols being mapped to those above. In this example, the "Grow 1" symbol will be displayed in superposition over the symbol selected at step 520 for this position.

In an example, the symbol from the overlay reel may completely replace the underlying symbol. In another example, if the underlying symbol contributes to a win or falls into a designated category, for example such as a scatter symbol that forms part of a trigger condition, then processor 204 control display of the symbols so that display alternates between the overlay symbol and the underlying base symbol.

Figure 12:
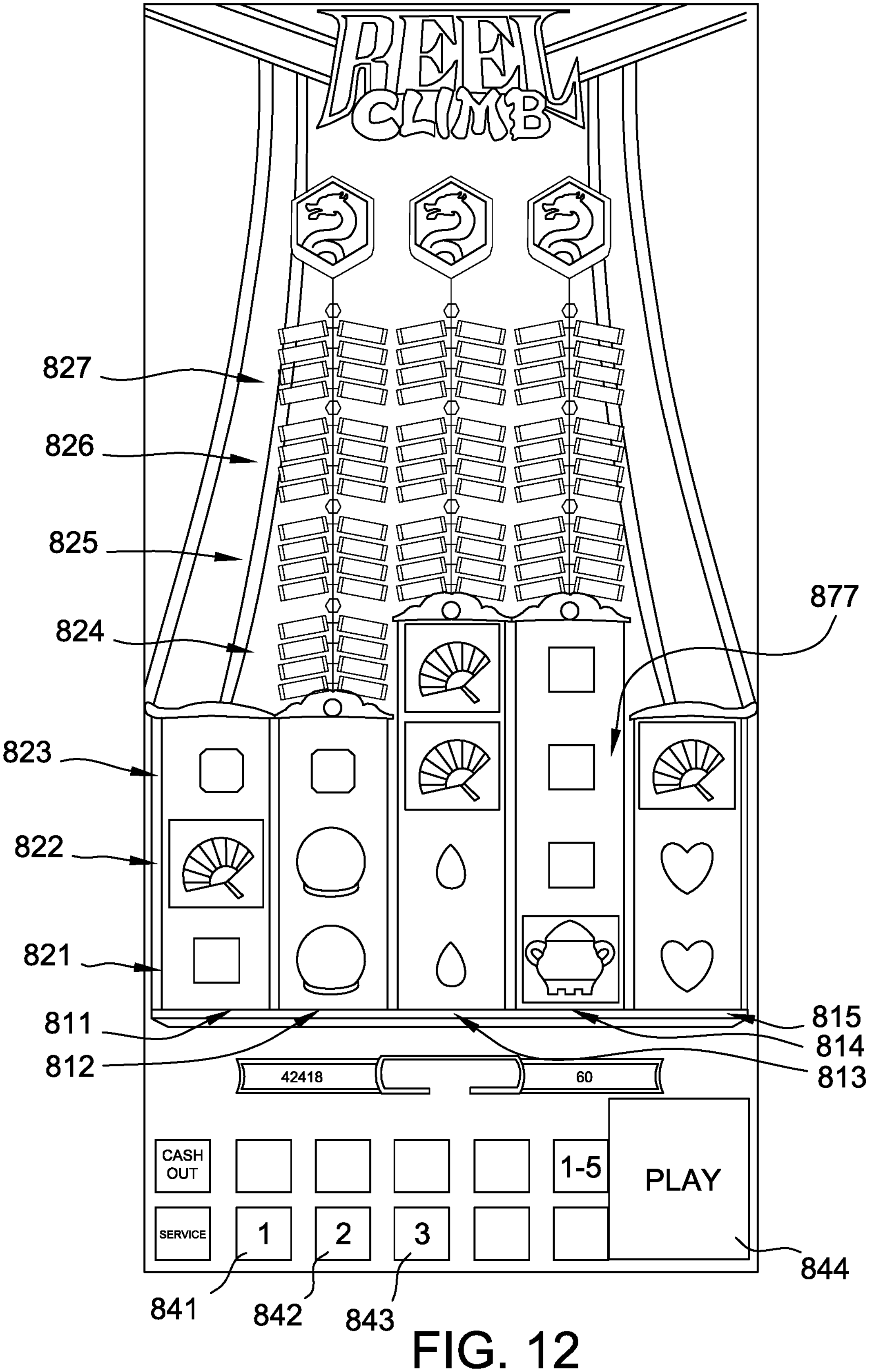
FIG. 12 is an example screen display.

FIG. 6B illustrates that as the number of symbol positions in any individual column grows, the corresponding overlay reels are changed. For example, if the third and fourth columns of symbol positions 813, 814 have four symbol positions each as shown in FIG. 12, then in one example overlay reel 623 corresponding only has two designated symbols 681, 682 in contrast to the three shown in FIG. 6A Similarly overlay reel 624A only has two designated symbols 671, 675 compared to the three shown in FIG. 6A.

A reason for modifying the overlay reels is to control the rate of growth of the columns of symbols. It will be appreciated that if the same reels were used, for example the reels of FIG. 6A were used irrespective of the number of symbol positions, there would be a higher chance of a designated symbol landing on a symbol position as the number of symbol positions grow. Accordingly, the process of the columns growing would tend to accelerate after the initial growth of a reel. Using different overlay reels in dependence on the number of symbol positions enables the rate of growth to be controlled.

It will also be appreciated that there are more symbol positions to populate as the columns grow. Thus during the mapping process performed by processor 204 at step 750 is based on the number of symbol positions. For example, if for the fourth column of symbol positions 814, the symbol selected to be mapped to the bottom symbol position of the column from overlay reel 3 624 is the blank symbol 674, then the three symbols above it, i.e. blank symbols 672, 673 and designated symbol 671 would be mapped to the symbol positions of the fourth column, such that the designated symbol 671 would be displayed at the symbol position in the fourth row 824.

Figure 19:
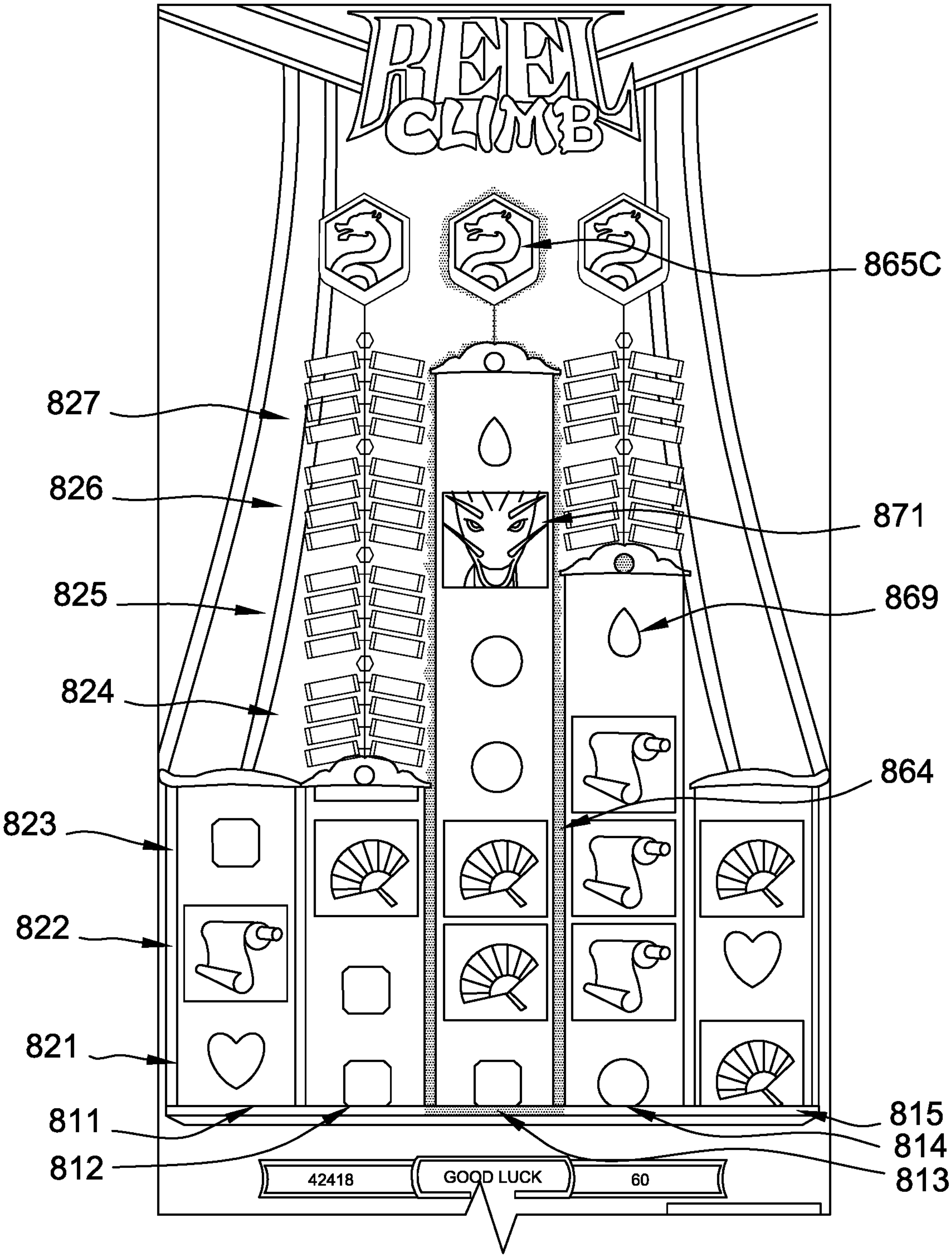
FIG. 19 is an example screen display.
Figure 21:
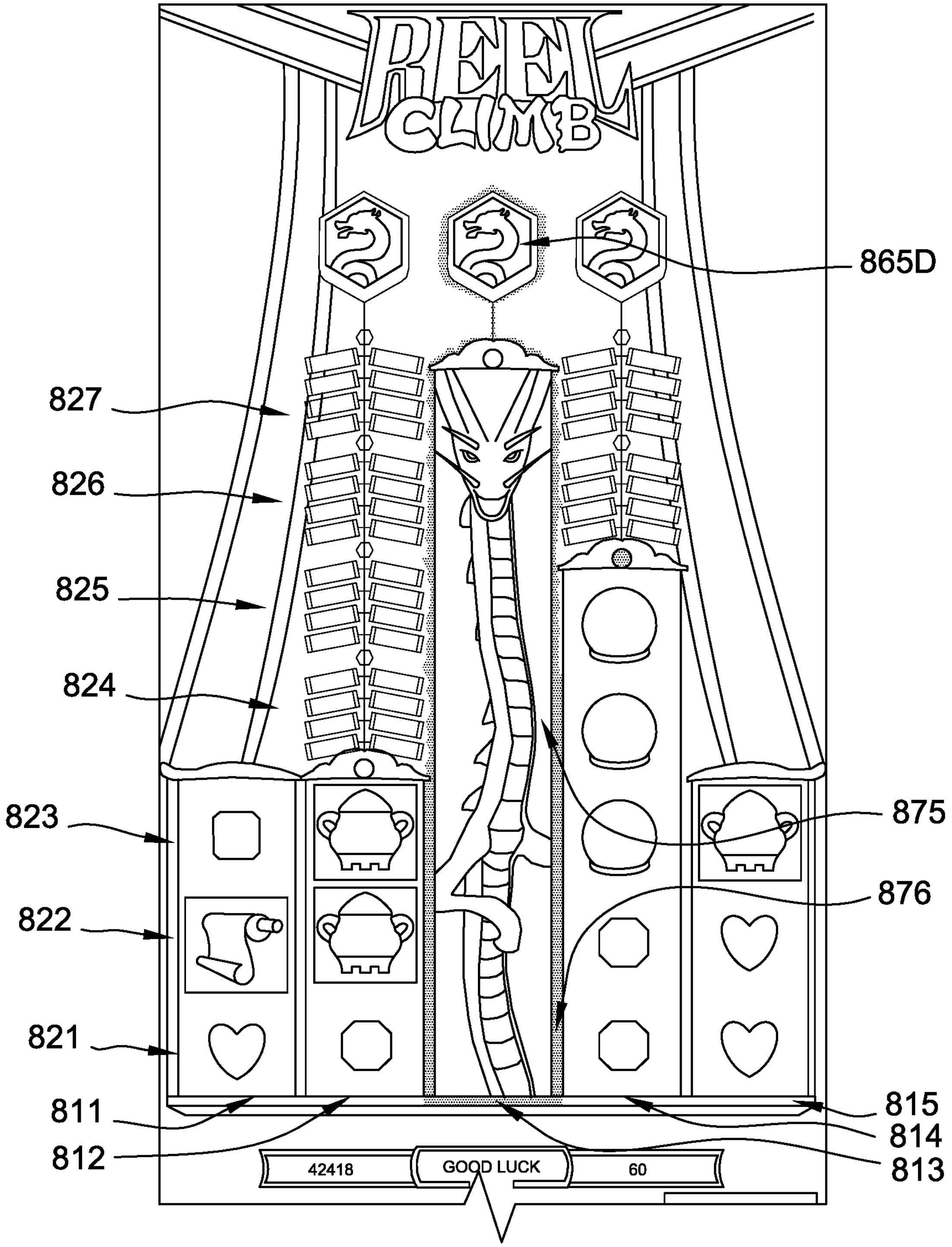
FIG. 21 is an example screen display.

Returning to FIG. 5, at step 530, the processor 204 controls display 240 to display the selected symbols at the set of symbol positions corresponding to the current symbol state. At step 535, the processor determines whether any column that has reached its maximum height (in this example seven symbol positions) has a wild symbol selected for one of the symbol positions. If so, the processor 204 changes all the symbols of this column into wild symbols. An example is illustrated in FIGS. 19 and 21. As shown in FIG. 19 the middle column 813 has reached the maximum height and a wild symbol 871 that has landed in the second top row. As shown in FIG. 21, all of the symbols have been turned wild and are displayed as an oversized wild symbol 875 that occupies all the symbol positions of the third column 813.

At step 545, the processor evaluates the displayed symbols based on a pay table. In an embodiment of the invention, the evaluation mechanism is a reel power mechanism where all symbol positions of any one column can be combined with the symbol positions of other column positions and the symbols are evaluated from left to right. It is advantageous to use a reel power type evaluation because there is no need to add additional win lines when additional symbol positions are added. It will be appreciated that the added symbol positions provide the player with additional opportunities to obtain a winning combination. For example, with the initial five by three array of symbol positions shown in FIG. 8 there are 3×3×3×3×3=243 ways that the player can win. The addition of a single symbol position to the middle column means that there are 3×3×4×3×3=324 ways to win.

After the symbols are evaluated at step 545, the processor 204 determines at step 550 whether there is a Grow 1 symbol at any of the symbol positions and if so adds one symbol position step 555. An example of a Grow 1 symbol is symbol 852 in FIG. 9. As can be seen in the transition between the screens displayed in FIG. 9 and FIG. 10 a symbol position is added in the middle column 813.

At step 560 the processor determines whether there is a Grow 2 symbol. That is whether there is the secondary category of designated symbol. An example of the second class of designated symbol is symbol 878 shown in column 3 813 in FIG. 13. Grow 2 symbol 878 has the word “Max” over the top to indicate that the player that the maximum number of symbol positions will be added to the third column responsive to its selection. That is, sufficient symbol positions will be added such that the column of symbols has its maximum height. Accordingly, if it is determined that there is a Grow 2 symbol at step 560, the processor sets the symbol state in respect of the column to the maximum number of symbol positions.

In order to provide a mechanism by which the number of symbol positions in a column can reduce, if the column reaches a maximum height as determined at step 570, the processor 204 sets 575 a column counter specific to the column to monitor a number of games that will be conducted with the column at the maximum height before it is reset to its initial height. In one example illustrated in the example before the counter is set to 3 at step 575.

At step 580 the processor decreases any counters that are pending by one and at step 585, the processor determines whether any column counter has reached zero. If it has at step 582 the processor resets the symbol position state in respect of that column, such that for the next game the column will be set to its initial state.

At step 590, the game ends. In this respect, in the context of the embodiment, a reference to a game ending is used to apply both to the end of a paid game and to the end of any awarded free games and hence the flow chart 500 shows different starting points for a next free game 594 and a next paid game 592.

In one example, a number of free games may be awarded by processor 204, for example in response to a trigger condition such as a particular symbol combination appearing during a paid game.

In this example, as the set of symbol positions can change dynamically during any game if there is a next free game 594 after game ends 590, the processor 204 returns to step 515 and controls the display based on the current symbol position state which could include any modifications that occurred in the prior game. Accordingly, if there are a series of free games awarded as part of playing the game, the processor 204 iterates through each of the free games and the symbol position state used in any individual free game will take into account any symbol positions the processor 204 added or reset during the prior free games.

Where the next game is paid game 592, then the processor 204 reenters the process at step 505 by receiving a bet option in respect of the next paid game. This enables the symbol position state to be retrieved based on the current bet option in that is being made. Thus, avoiding a player from betting higher once symbol positions with improved chance of winning have been established. In some examples, there may be a time period after which the symbol positions reset. For example, if the gaming machine is inactive for a defined period.

In other embodiments, the processor 204 may determine whether a player has been identified at the gaming machine and for example by obtaining a player identifier entered by the player. For example, using a player tracking card. In such an embodiment, when the player removes their player tracking card, the symbol position state of the gaming machine may be reset.

A number of other variations may be made in other example embodiments. For example, rather than the separate base and overlay reels being used, in other embodiments, the designated symbols could be located on the base reels. As indicated above, this is not as advantageous as where overlay reels are used because the overlay reels allow for independent control of the probability of the symbol positions being added to any one of the columns and symbol positions.

In such embodiments, should a grow symbol appear on a reel that has reached a maximum height, an alternative award can be made such as an extra game at the free height or a reset of the counter.

In an example embodiment of the invention, it is advantageous that a ratio between the first category of designated symbols (Grow 1) that add one symbol position and the second category of symbols (Grow 2) that adds sufficient symbol positions for the columns to grow to their maximum height is in the range of 1-15 to 1-25 and preferably about 1-20. This ratio ensures that the column height increases incrementally much more often than it does sharply.

It will also be appreciated that while it has been described that the two set of overlay reels that have been described in FIGS. 6A and 6B, the number of overlay reels used for each column will depend on the degree of control that is intended to be applied over the growth of the symbols. In one example corresponding to the embodiment of FIG. 8, there will be four overlay reels corresponding to each column and particular to there being three symbol positions in a column, four symbol positions in a column, five symbol positions in a column and six symbol positions in a column respectively. That is, once the column has reached a top position of the example of FIG. 8 there is no need for an overlay reel to be spun. In other words in this example the number of overlay reels correspond to the number of symbol positions that can be added to the base or initial number of symbol positions in a given column.

As indicated above, in other embodiments there may not be both maximum growth and single position growth symbols. In alternatives there could just be single position growth in response to a designated symbol or individual designated symbols could specify the number of symbols to be added. Further overlay reels of different columns could have different designated columns.

Figure 23:
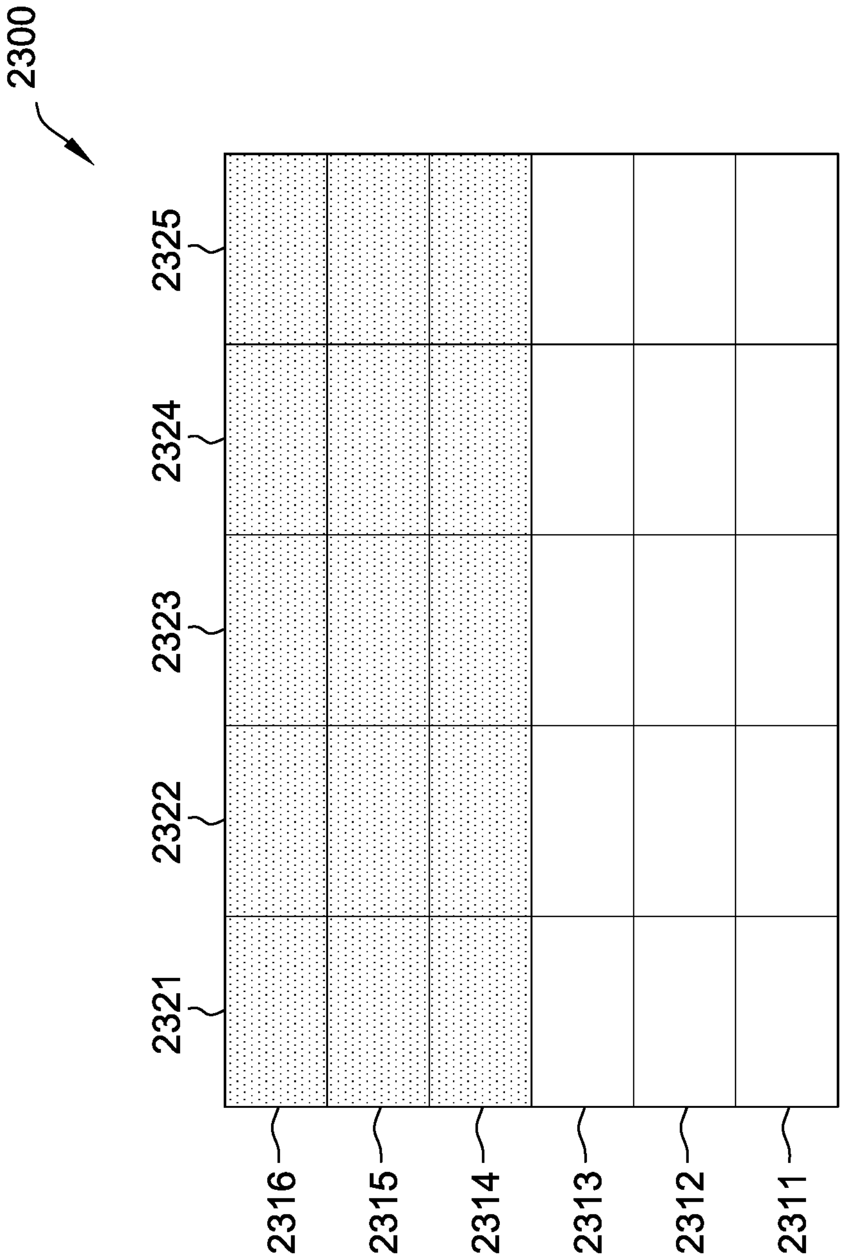
FIG. 23 is an example of a symbol position arrangement.
Figure 24:
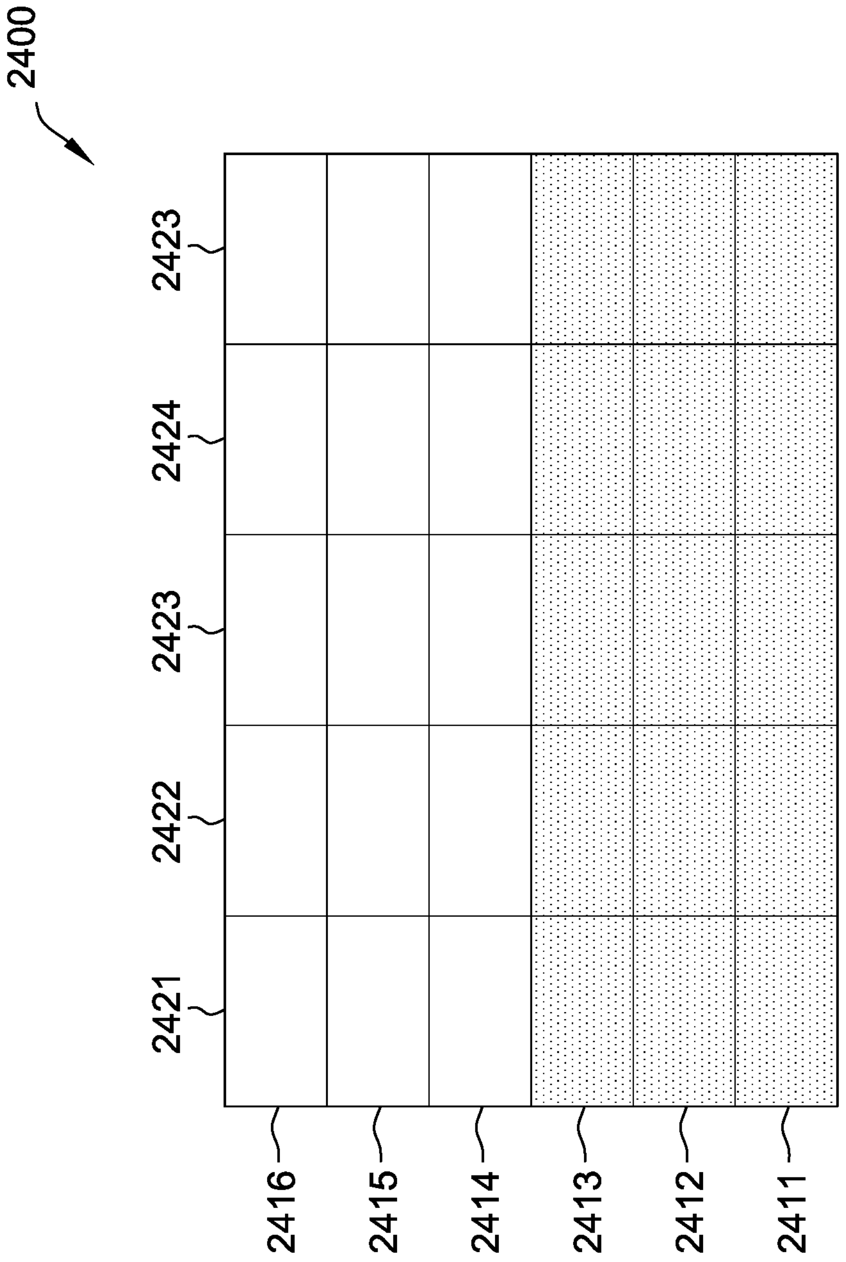
FIG. 24 is an example of a symbol position arrangement.
Figure 25:
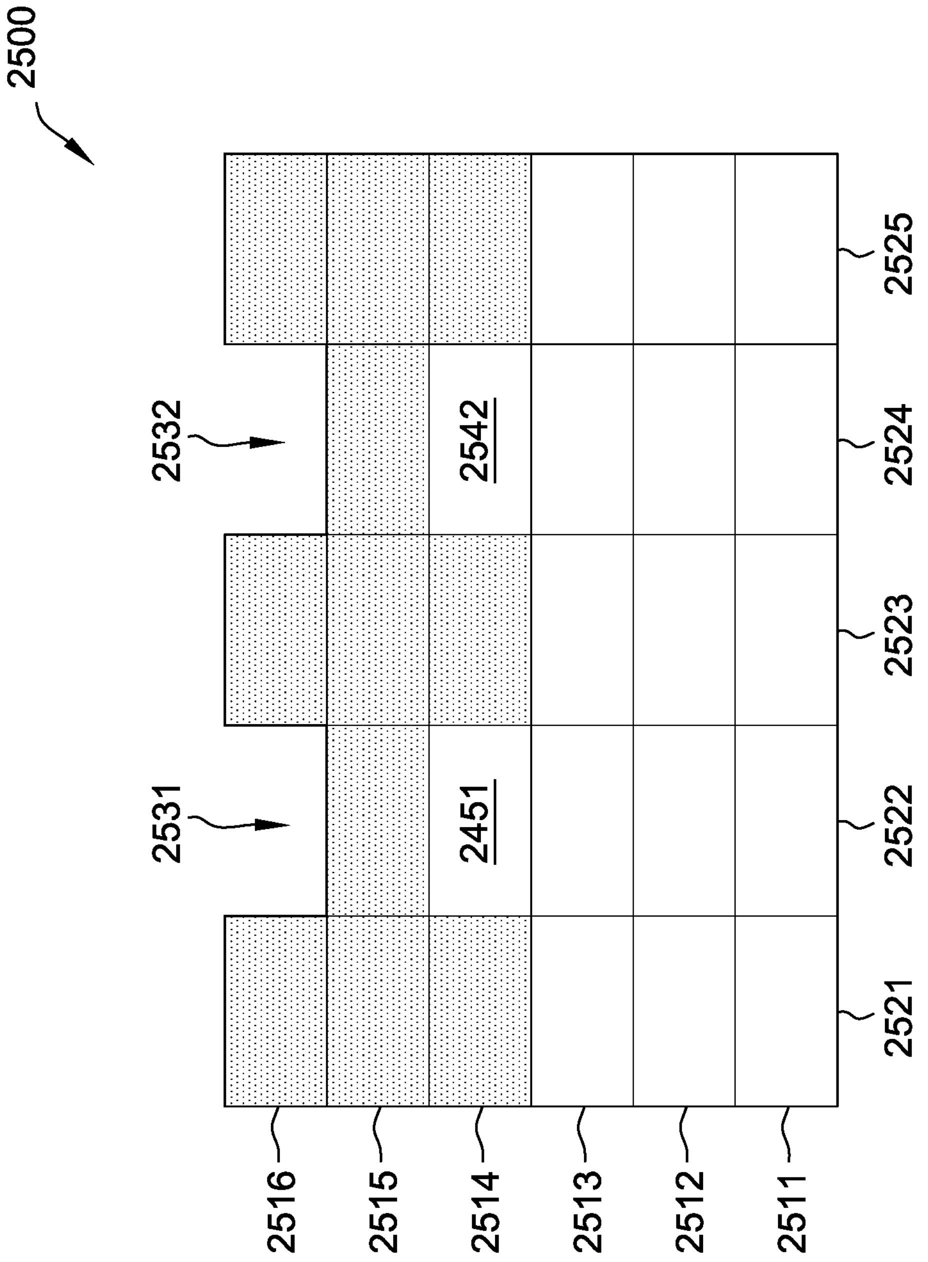
FIG. 25 is an example of a symbol position arrangement.

FIGS. 23 to 25 illustrate some sample alternative arrangements. As shown in FIG. 23 there are five columns 2321-2325. There are six rows of symbol positions 2411-2416 but the symbols in rows 2414-2416 are shaded out to show that they are either not initial displayed or are initially active. In another words a base set of symbol positions is provided by rows 2411-2413. In this example, five overlay reels are provided corresponding to each of the columns 2421-2425.

FIG. 24 again has five columns 2421-2425. This example illustrates that the added symbol positions need not be added above the initial array of symbol positions in this case formed by rows 2411-2413. As illustrated in FIG. 24, symbol positions can be added below the initial array of symbol positions at rows 2414-2416. It will be appreciated that this can be done in order to match a theme of a game. Again, in this example, an overlay symbol reel strip is provided for each of the columns 2421-2425. In this example, the mapping process of step 750 can be performed using the top symbol position of each row as the reference position.

FIG. 25 shows an example where different numbers of symbol positions can potentially be added to different columns. Again, this example shown five columns although different numbers of columns can be used in other embodiments. In this example, columns 2521-2525 are initially at different heights. In this example in column one 2521, column three 2523 and column five 2525 there are initially three symbol positions in rows 2511, 2512, 2513. How that in column two 2522 and column four 2524 there are also symbol positions initially in row 2514. That is, at symbol positions 2541, 2542. As illustrated in FIG. 25, each of columns 2521, 2523, 2525 can grow by three symbol positions in rows 2514-2515 whereas columns 2522, 2524 can only grow by one symbol position in row 2515. Regions 2531, 2532 are not occupied by symbol positions.

EXAMPLE

An example embodiment is described in relation to FIGS. 8 to 23 which are screenshots of an example embodiment. While a number of features of shown in these drawing are graphical in nature, they are nonetheless important to the implementation of the embodiment as they enable a player to determine how the game is being conducted by the processor 204. Where a player can understand how a game is operating, they can better appreciate the underlying mechanics of the game.

If players cannot understand a game they tend to stop playing the game. Conversely, the more quickly the player can understand how the game operates, the more likely they are to persist with playing with it. Further, in the present game where a symbol state is retained from game to game including between, paid games in some examples, it is important that the player is aware of the current state of the game in order to inform their decision as to whether they wish to play an additional game.

Referring to FIG. 8, there is shown an example of a display of a game in an initial symbol position state for a particular wagering option, here a sixty-credit wager which the player has selected by selecting Bet 1 button 841. Bet 2 button 842 and Bet 3 button 843 correspond to alternative wagers and symbol position states are stored separately for each of them.

Accordingly, the display in FIG. 8 corresponds to step 515 in method 500 where the processor 204 has controlled the display based on the initial symbol state to display three rows 821, 822, 823 of active symbol positions in each of five columns 811, 812, 813, 814, 815. As indicated by firecracker symbols 851 arranged in rows 824, 825, 826, 827, four additional symbol positions can be added to each of the middle three columns 812-814. The symbols displayed in 821, 822, 823 in FIG. 8 may correspond to, for example, a last spin of the reels of a prior game.

Figure 9:
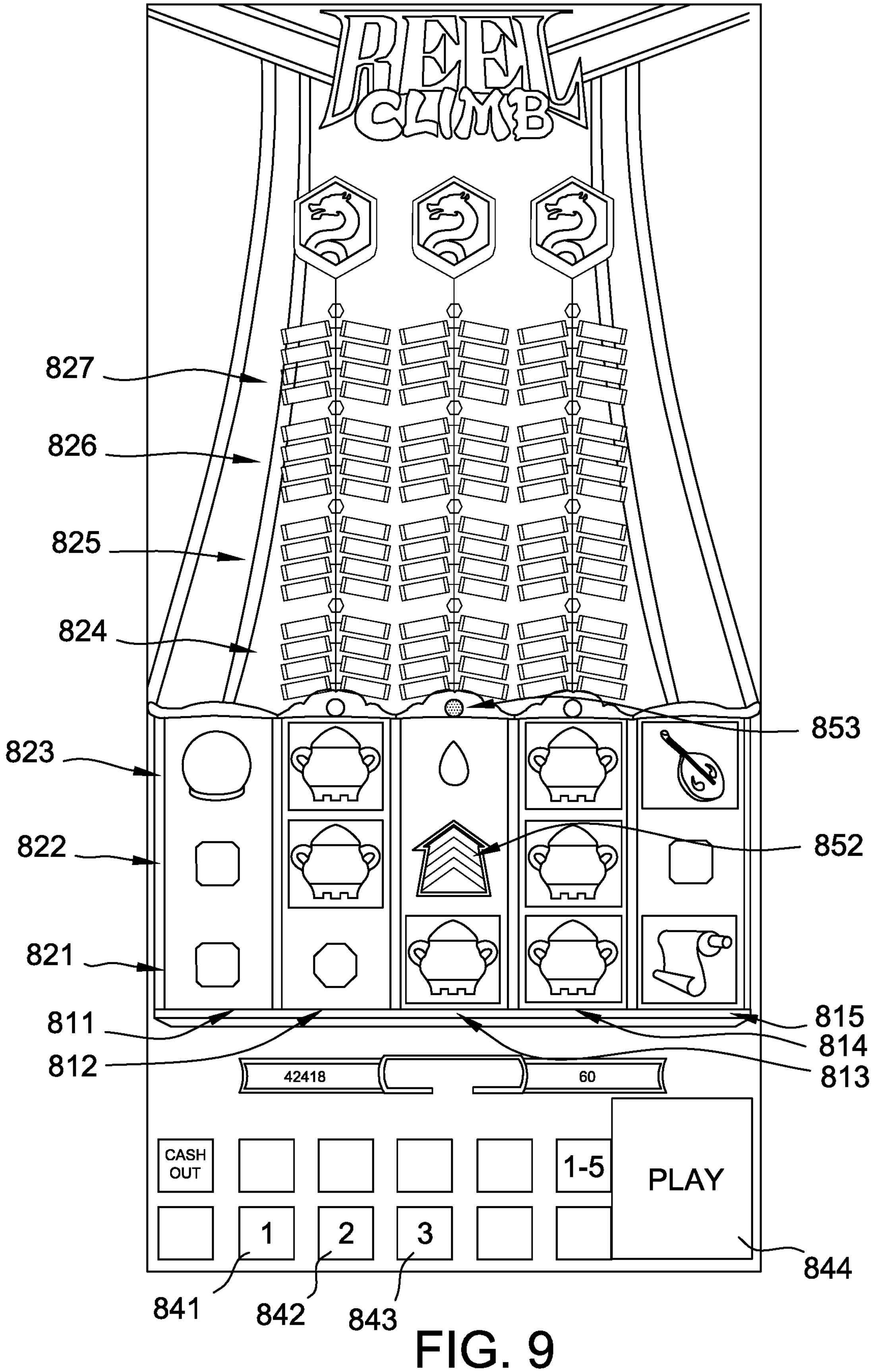
FIG. 9 is an example screen display.

FIG. 9 shows an example in which symbols have been selected, responsive to the player pressing play button 844, from both the base and overlay reels and the selected symbols have been displayed at step 530. Accordingly, at step 550 processor 204 will determine that there is a grow symbol 852 and accordingly the processor 204 will proceed to add one symbol position at step 555. As shown in FIG. 9, as a precursor to adding the symbol position, the processor 204 controls the display to show one of the sets of firecrackers being lit, in this example by displaying light 853 at the top of middle column 813.

As shown in FIG. 10, the firecracker has exploded to reveal an additional symbol position 854. This assists to communicate to the player the addition of the symbol position 854. In this respect, it will be appreciated that in FIG. 8, the game outcome has been evaluated and no award of credits has been made and this is not changed by the addition of the symbol position which is added for the next game round. In alternative examples, the evaluation of the symbols against the pay table may occur after the number of symbol positions in a column has been increased so that it applies to the current game round and not just the future game round.

Figure 11:
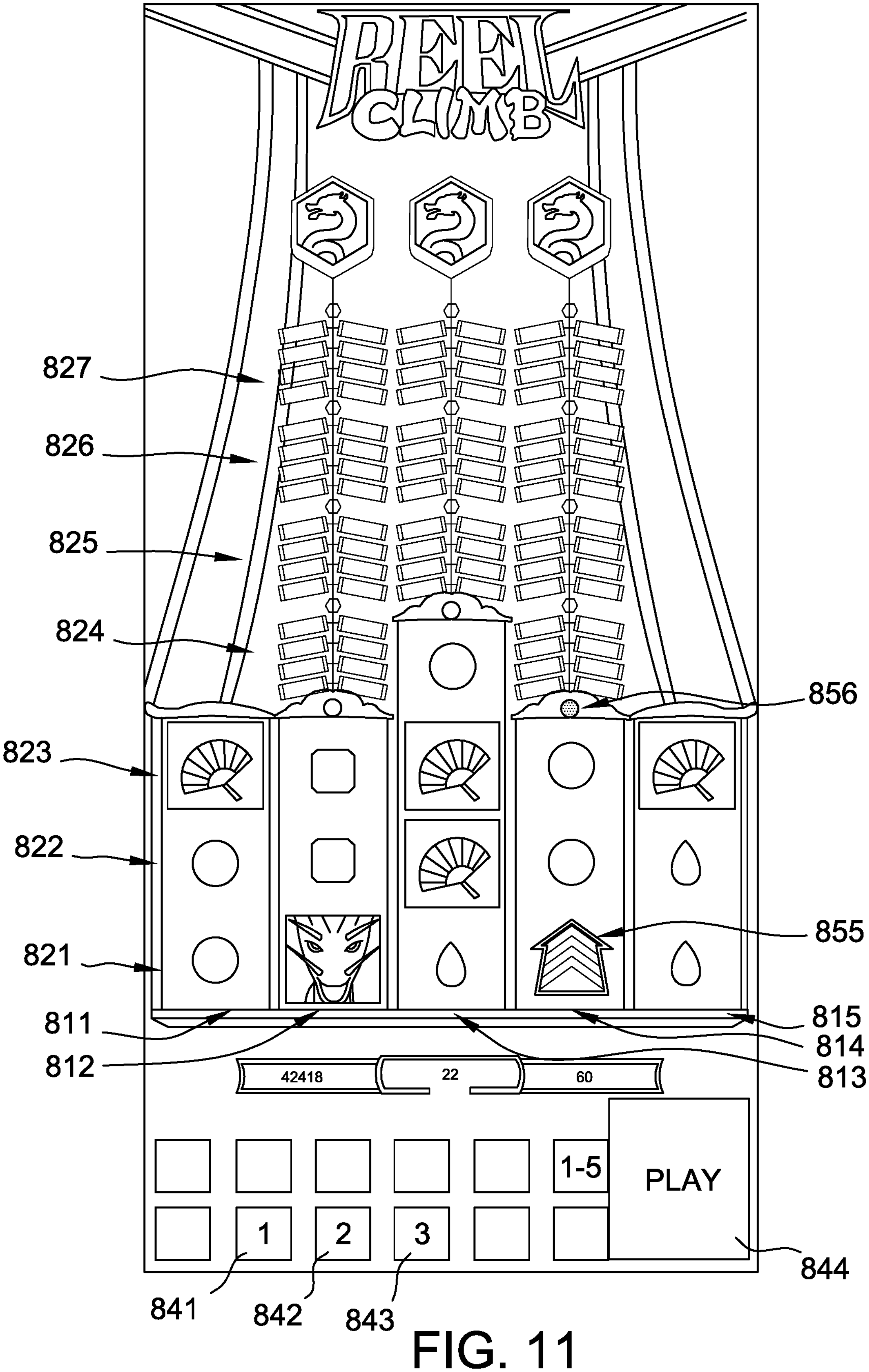
FIG. 11 is an example screen display.

FIG. 11 shows that a further Grow 1 symbol 855 has been selected in column four 814 and a further firecracker has been lit 856. FIG. 12 shows that an additional symbol position 877 has been added to the set of symbol positions.

Figure 13:
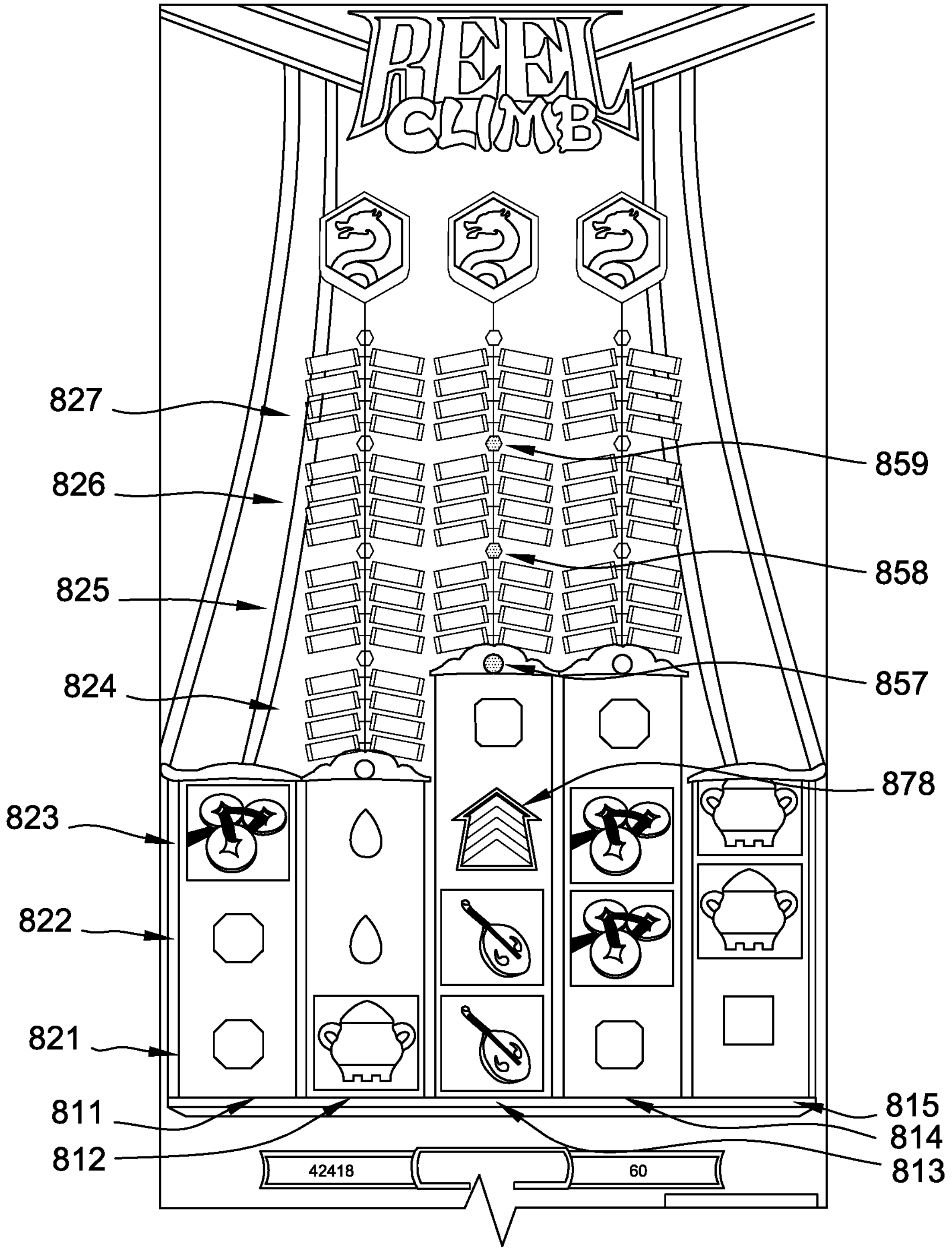
FIG. 13 is an example screen display.
Figure 14:
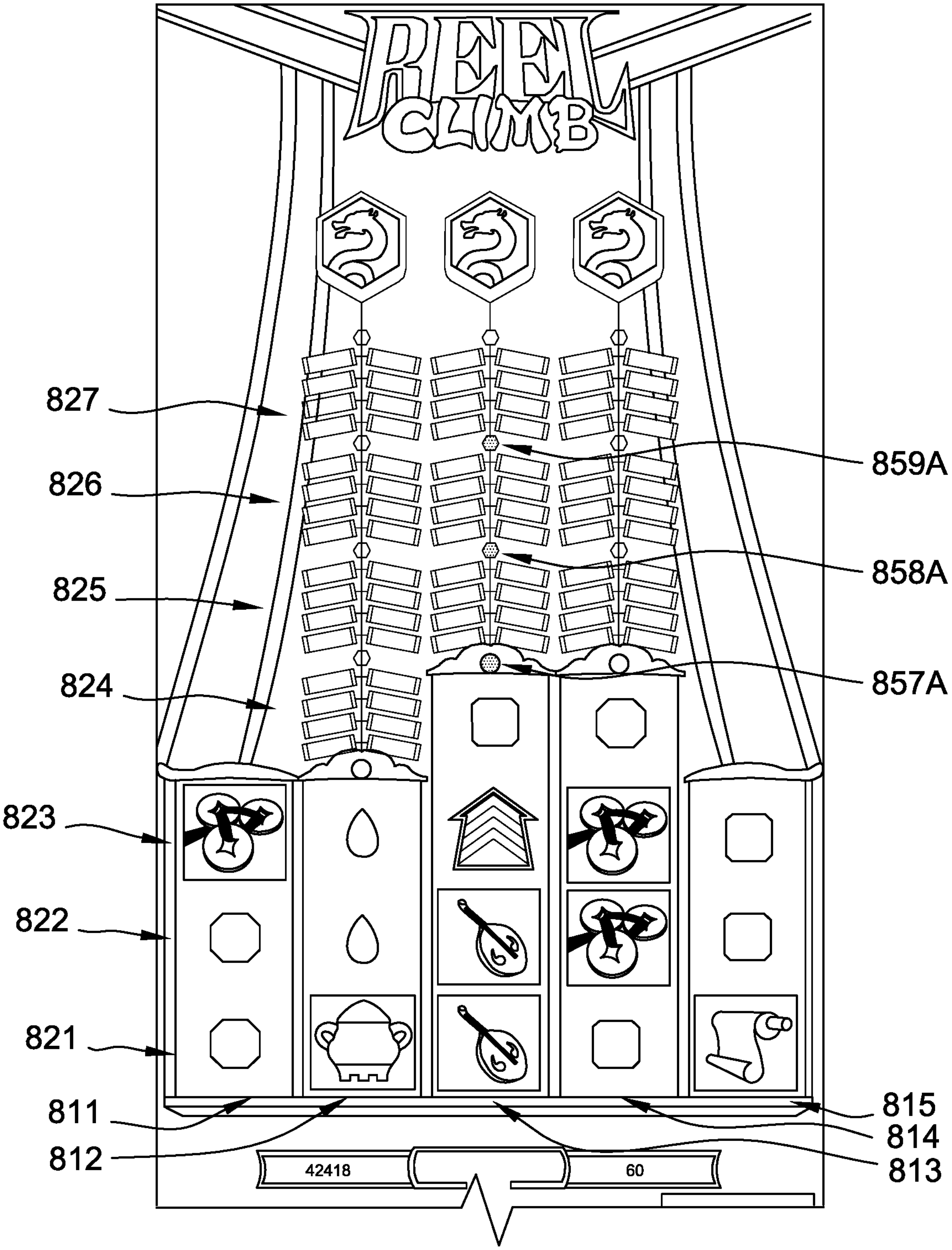
FIG. 14 is an example screen display.
Figure 15:
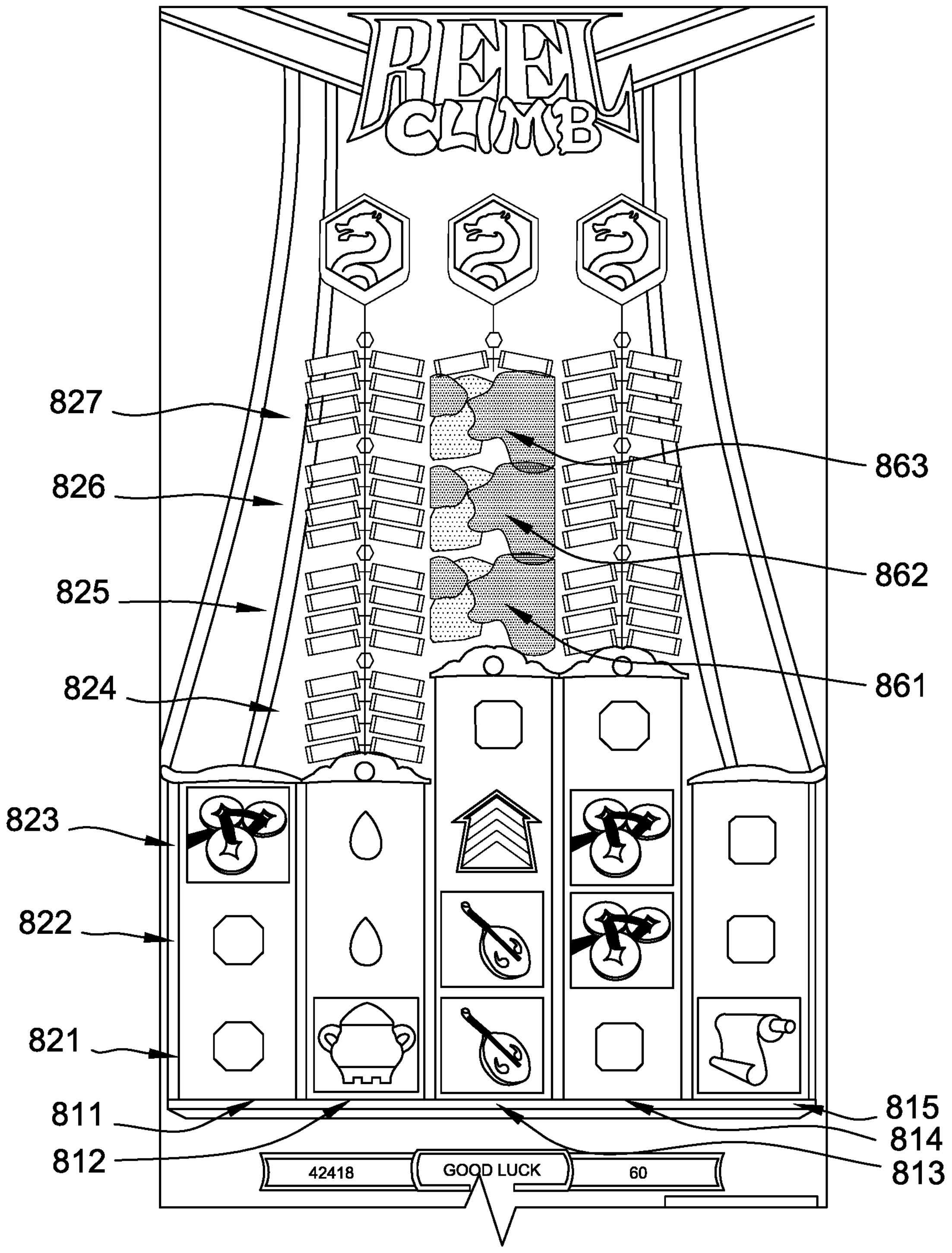
FIG. 15 is an example screen display.

FIG. 13 shows that a Grow 2 symbol 818 has been selected with the result that the processor 204 determines to add symbol positions such that the column 813 reaches its maximum height. To communicate this to the players, processor 204 animates the display to show that three firecrackers have been lit 857, 858, 859. As shown in FIG. 14, this is emphasized graphically by a subsequent display of lights 857A, 858A, 859A showing them burning brighter as if a fuse is running down until explosions 861, 862, 863 are shown in FIG. 15.

Figure 16:
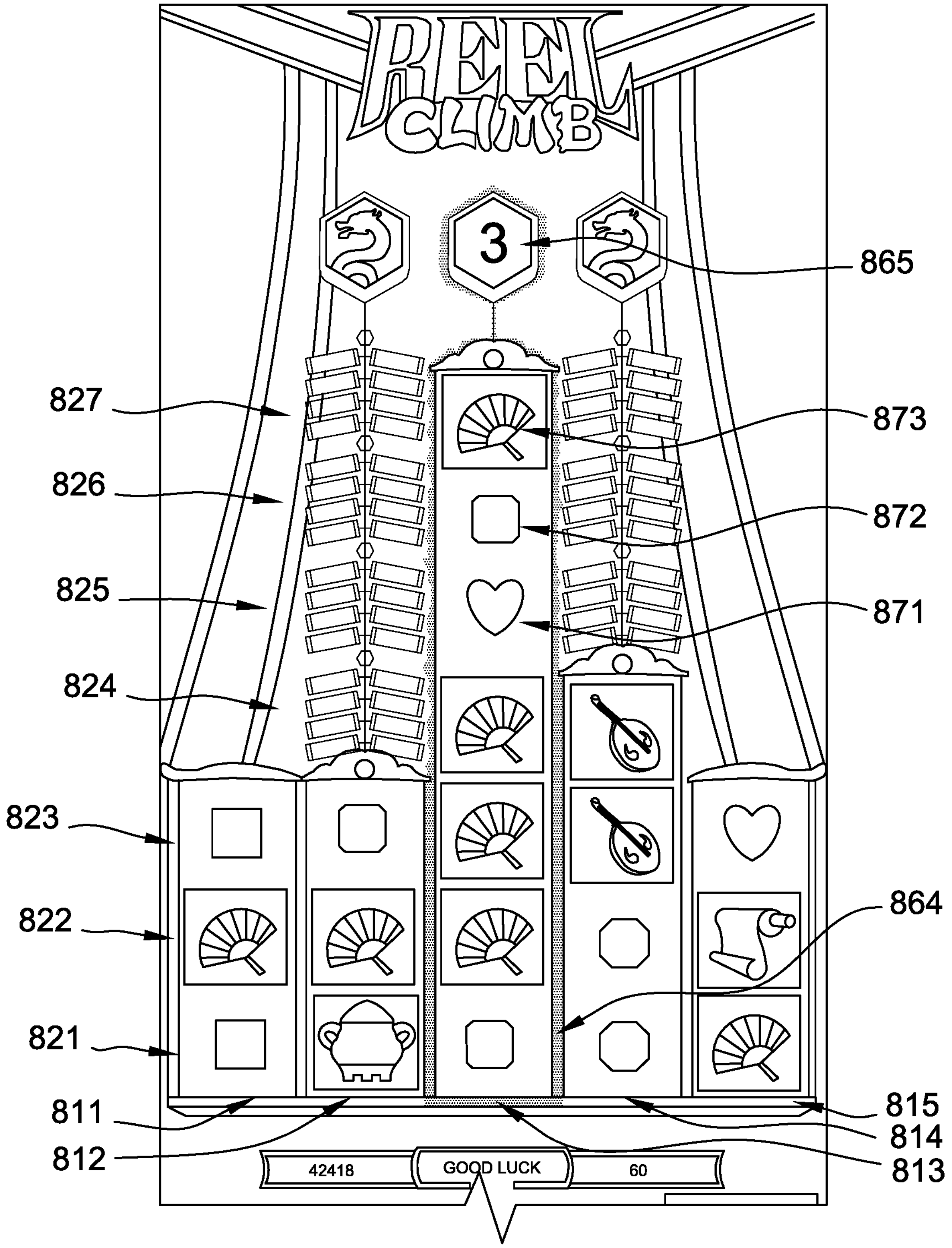
FIG. 16 is an example screen display.

Following the explosion and as shown in FIG. 16, there are now three new symbol positions 871, 872, 873 in the middle column 813. In addition, because it has been determined at step 570 that the column has reached maximum, a counter 865 is shown at the top of the column 813 to show how many game rounds the column will be kept at the maximum height, in this example for three game rounds. A flame 864 is animated around the border of the column and counter 865 in order to assist in communicating to the player that they have this column for three additional games. These aspects of the animation help to inform the player of the persistence of added symbol positions, so that, for example, in a paid game, the player would be unlikely to cash out while the column is at its maximum height.

Figure 17:
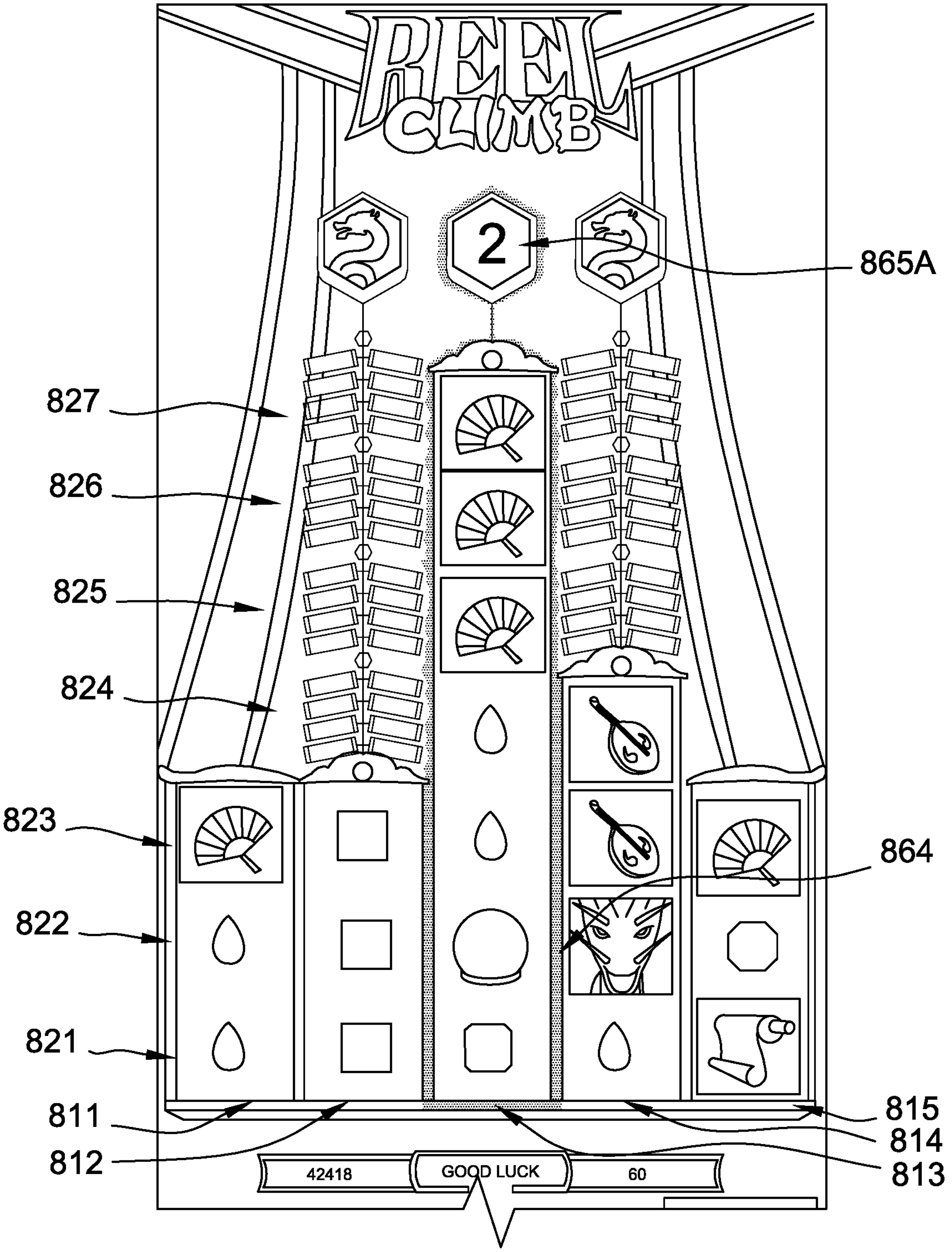
FIG. 17 is an example screen display.

FIG. 17 shows a subsequent game round where the counter has been decreased by one to indicate that there will be two further games with a column at maximum size. Counter has an updated state 865A that shows two rounds remaining.

Figure 18:
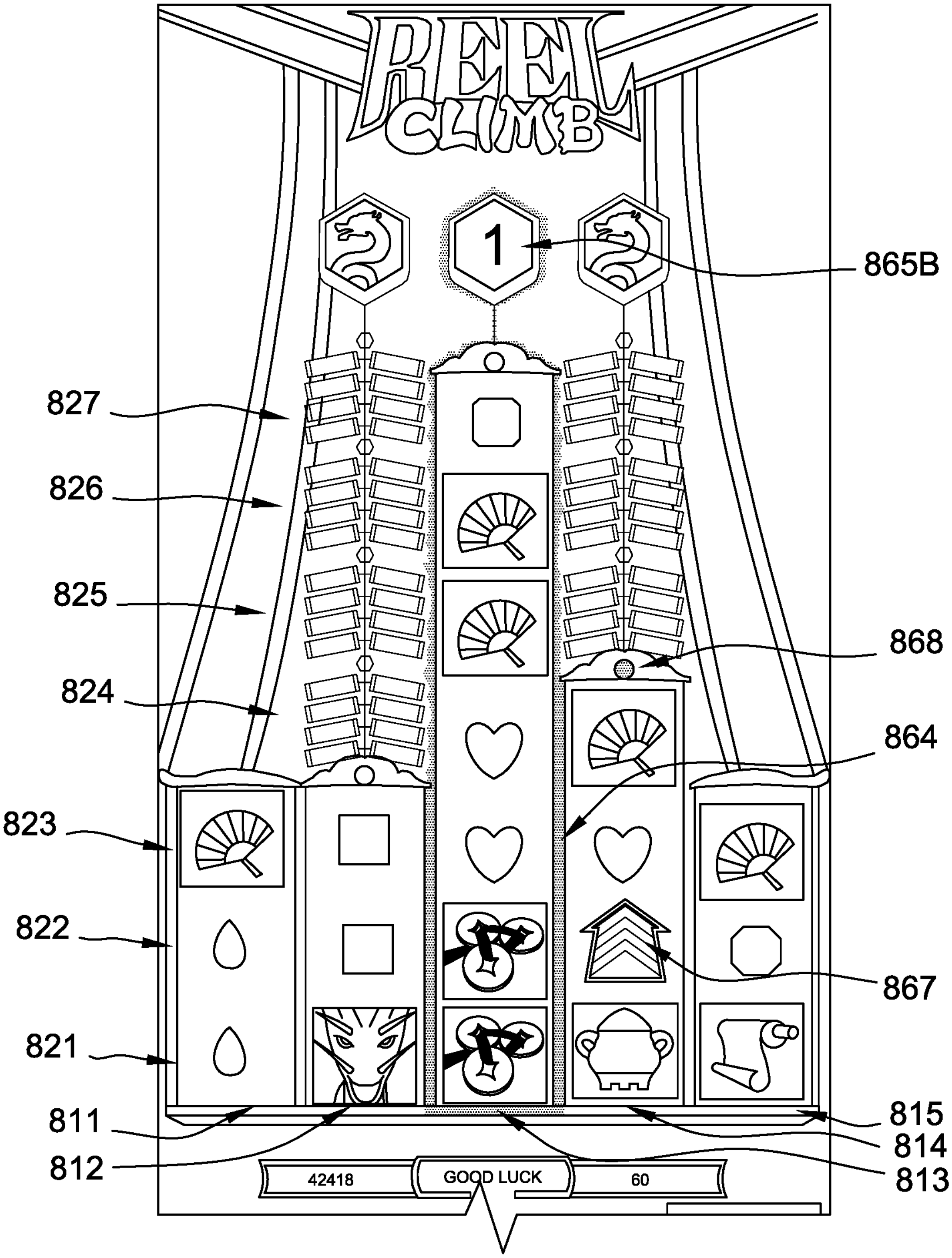
FIG. 18 is an example screen display.

In FIG. 18, the counter has further updated state 865B to indicate that only one game round has added however a further Grow 1 symbol 867 has landed in the fourth column 814 resulting in a firecracker being lit and a further symbol position 869 being added in FIG. 19.

As shown in FIG. 19, a wild symbol 871 has landed in the middle symbol column 813 which will result in all the symbol positions being turned wild by process 204 at step 540.

Figure 20:
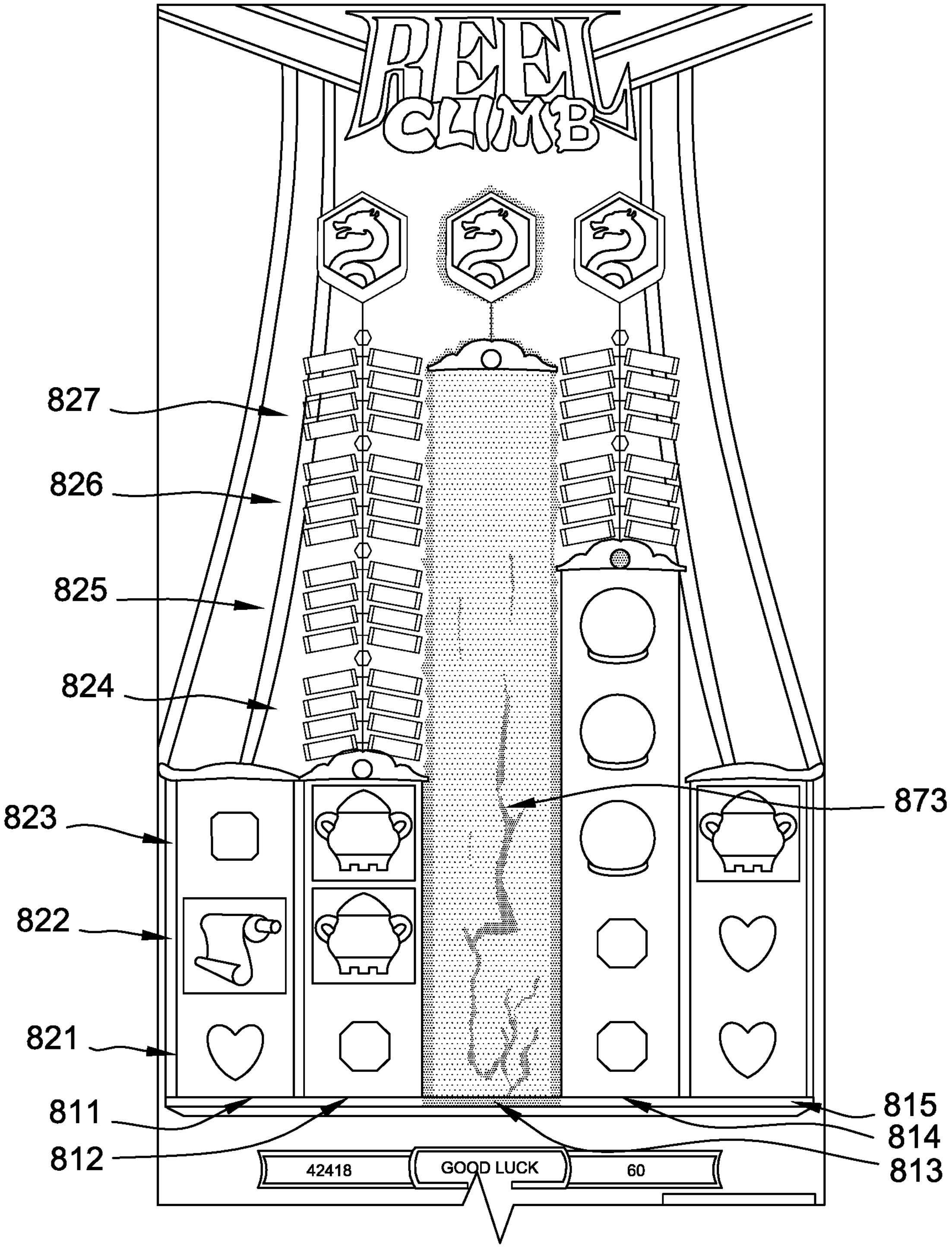
FIG. 20 is an example screen display.

A special transformation animation 873 is displayed in FIG. 20 which is to indicate to the player a change is being made to the symbols of the column 813.

An oversized wild symbol 875 is displayed in FIG. 21 occupying all the symbol positions of the column 875. In this example, as a wild symbol will occupy every symbol position and a reel power combination evaluation mechanism is being applied, the existence of the wild symbol at all symbol positions effectively operates as a seven times multiplier of all wins formed from the other columns as they will occur seven times. It will also be seen that the flame animation 876 around the border of the expanded wild symbol 875 has been changed in order to assist in indicating the presence of the expanded wild symbol.

FIG. 21 also shows that the location 865D where counter was located no longer has a counter, however, the flame animation 876 extends around this location to indicate this is the last game round for which the column will be held at its maximum height. In an alternative example, a counter state showing a value of 0 could be shown.

Figure 22:
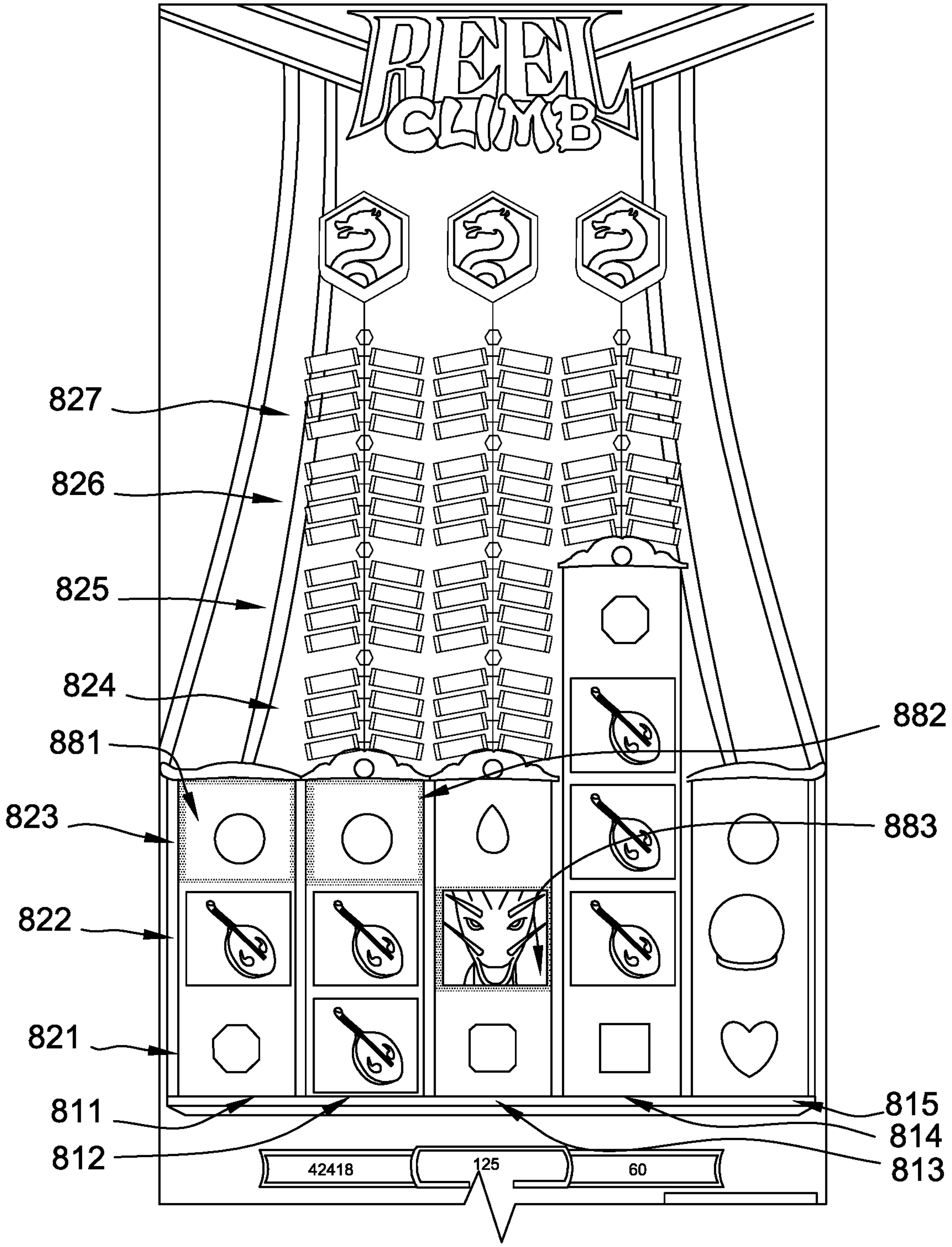
FIG. 22 is an example screen display.

FIG. 22 shows the next game and that middle column 813 has been reset at step 582 to its initial size such that only three symbols are displayed for the middle column. Note that five symbols persist in the fourth column 814 as this has not been reset and resetting of columns is independent of one another.

In FIG. 22, symbols 881, 882, 883 form a winning combination and are highlighted by lighting around the borders of the respective symbol positions.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising:

at least one processor;

a display device; and a memory storing (a) a current symbol position state defining, for each of a plurality of columns of symbol positions, a number of symbol positions wherein each symbol position is configured to include a symbol; and (b) instructions which when executed by the at least one processor cause the at least one processor to:

cause to be displayed on the display device the plurality of columns of symbol positions corresponding to the current symbol position state, each of the symbol positions including an initial symbol;

determine, based on one or more returned values of a random number generator, whether to include at least one designated symbol at a first symbol position included within a first column of the plurality of columns of symbol positions, wherein the designated symbol represents a change in the symbol position state;

cause to be displayed on the display device, in response to a determination to include the designated symbol at the first symbol position, a replacing of the initial symbol at the first symbol position with the designated symbol;

in response to the designated symbol being displayed in the first symbol position, modify the current symbol position state for the first column to include at least one additional symbol position for a next symbol selection;

retrieve from the memory, the current symbol position state for each column; determine based on the retrieved current symbol position state for each column, whether the current symbol position state for the column is at a maximum symbol position state; and for each column wherein the current symbol position state is determined to be at the maximum symbol position state, increment a column specific counter to monitor a number of games that will be conducted with the column at the maximum symbol position state.

2. The gaming system of claim 1, wherein the instructions further cause the at least one processor to set the current symbol position state of the first column to an initial symbol position state in response to determining that the column specific counter associated with the first column has reached a predetermined value.

3. The gaming system of claim 1, wherein the instructions further cause the at least one processor to select stopping positions of a plurality of overlay reel strips based on the one or more returned values of the random number generator to determine whether to map the at least one designated symbol to the first symbol position.

4. The gaming system of claim 3, wherein the plurality of overlay reel strips include a first type of designated symbol and a second type of designated symbol, and wherein the instructions further cause the at least one processor to modify the symbol position state for the respective column differently depending on whether the at least one designated symbol is the first type of designated symbol or the second type of designated symbol.

5. The gaming system of claim 3, wherein a set of overlay reel strips is associated with each of the plurality of columns, each overlay reel strip of the set of overlay reel strips including a different number of designated symbols, and wherein the instructions further cause the at least one processor to determine which overlay reel strip of the set of overlay reel strips to use for each of the plurality of columns based on the current symbol position state.

6. The gaming system of claim 1, wherein the instructions further cause the at least one processor to select the initial symbols for the symbol positions by selecting stopping positions of a plurality of base reel strips based on one or more second returned values of a random number generator, each base reel strip of the plurality of base reel strips associated with a respective one of the columns.

7. The gaming system of claim 6, wherein the memory further stores a pay table, and wherein the instructions further cause the processor to evaluate the initial symbols for winning combinations based on the pay table.

8. The gaming system of claim 1, wherein the instructions further cause the at least one processor to display a wild symbol in each symbol position of a first column, in response to determining that i) a first column has reached a maximum position state and ii) the initial symbols of the first column include a wild symbol.

9. A computer-implemented method comprising:

causing a display device to display a plurality of columns of symbol positions corresponding to a symbol position state, each of the symbol positions including an initial symbol, the symbol position state defining a number of symbol positions for which symbols are to be selected for each of the plurality of columns;

determining, based on one or more returned values of a random number generator, whether to include at least one designated symbol at a first symbol position included within a first column of the plurality of columns of symbol positions, wherein the designated symbol represents a change in the symbol position state;

in response to a determination to include the designated symbol at the first symbol position, causing the display device to display a replacing of the initial symbol at the first symbol position with the designated symbol; and in response to the designated symbol being displayed in the first symbol position, causing the display device to modify the current symbol position state for the first column to include at least one additional symbol position for a next symbol selection;

retrieving from the memory, the current symbol position state for each column;

determining based on the retrieved current symbol position state for each column, whether the current symbol position state for the column is at a maximum symbol position state; and for each column wherein the current symbol position state is determined to be at the maximum symbol position state, incrementing a column specific counter to monitor a number of games that will be conducted with the column at the maximum symbol position state.

10. The computer-implemented method of claim 9, further comprising setting the symbol position state of the first column to an initial symbol position state in response to determining that the column specific counter associated with the first column has reached a predetermined value.

11. The computer-implemented method of claim 9, further comprising selecting stopping positions of a plurality of overlay reel strips based on the one or more returned values of the random number generator to determine whether to map the at least one designated symbol to the first symbol position.

12. The computer-implemented method of claim 11, wherein the plurality of overlay reel strips include a first type of designated symbol and a second type of designated symbol, and wherein the computer-implemented method further comprises modifying the symbol position state for the respective column differently depending on whether the at least one designated symbol is the first type of designated symbol or the second type of designated symbol.

13. The computer-implemented method of claim 11, wherein a set of overlay reel strips is associated with each of the plurality of columns, each overlay reel strip of the set of overlay reel strips including a different number of designated symbols, and wherein the computer-implemented method further comprises determining which overlay reel strip of the set of overlay reel strips to use for each of the plurality of columns based on the symbol position state.

14. The computer-implemented method of claim 9, further comprising selecting the initial symbols for the symbol positions by selecting stopping positions of a plurality of base reel strips based on one or more second returned values of a random number generator, each base reel strip of the plurality of base reel strips associated with a respective one of the columns.

15. The computer-implemented method of claim 14, further comprising evaluating the initial symbols for winning combinations based on a pay table.

16. The computer-implemented method of claim 9, further comprising displaying a wild symbol in each symbol position of a first column, in response to determining that i) a first column has reached a maximum position state and ii) the initial symbols of the first column include a wild symbol.

17. A non-transitory, computer-readable storage medium storing instructions that, when executed by at least one processor, cause the at least one processor to:

cause to be displayed on a display device a user interface including a plurality of columns of symbol positions corresponding to a symbol position state, each of the symbol positions including an initial symbol, the symbol position state defining a number of symbol positions for which symbols are to be selected for each of the plurality of columns;

determine, based on one or more returned values of a random number generator, whether to include at least one designated symbol at a first symbol position included within a first column of the plurality of columns of symbol positions, wherein the designated symbol represents a change in the symbol position state;

in response to a determination to include the designated symbol at the first symbol position, causing the display device to display within the user interface a replacing of the initial symbol at the first symbol position with the designated symbol;

in response to the designated symbol being displayed in the first symbol position, causing the display device to modify within the user interface the current symbol position state for the first column to include at least one additional symbol position for a next symbol selection;

retrieve from the memory, the current symbol position state for each column;

determine based on the retrieved current symbol position state for each column, whether the current symbol position state for the column is at a maximum symbol position state; and for each column wherein the current symbol position state is determined to be at the maximum symbol position state, increment a column specific counter to monitor a number of games that will be conducted with the first column at the maximum symbol position state.

* * * * *